US010694378B2

(12) United States Patent
Teruyama et al.

(10) Patent No.: US 10,694,378 B2
(45) Date of Patent: Jun. 23, 2020

(54) INTEGRATED CIRCUIT, COMMUNICATION METHOD, COMPUTER PROGRAM, AND COMMUNICATION APPARATUS

(71) Applicant: SONY CORPORATION, Tokyo (JP)

(72) Inventors: Katsuyuki Teruyama, Tokyo (JP); Tadashi Morita, Tokyo (JP)

(73) Assignee: SONY CORPORATION, Tokyo (JP)

( * ) Notice: Subject to any disclaimer, the term of this patent is extended or adjusted under 35 U.S.C. 154(b) by 8 days.

(21) Appl. No.: 14/774,240

(22) PCT Filed: Mar. 11, 2014

(86) PCT No.: PCT/JP2014/056371
§ 371 (c)(1),
(2) Date: Sep. 10, 2015

(87) PCT Pub. No.: WO2014/156620
PCT Pub. Date: Oct. 2, 2014

(65) Prior Publication Data
US 2016/0021536 A1 Jan. 21, 2016

(30) Foreign Application Priority Data

Mar. 29, 2013 (JP) ................................. 2013-073977

(51) Int. Cl.
G06F 21/44 (2013.01)
H04W 12/06 (2009.01)
(Continued)

(52) U.S. Cl.
CPC ............ H04W 12/06 (2013.01); G06F 21/44 (2013.01); G06F 21/445 (2013.01);
(Continued)

(58) Field of Classification Search
CPC ...... H04W 12/06; H04L 9/32; H04L 63/0869; G06F 21/445
See application file for complete search history.

(56) References Cited

U.S. PATENT DOCUMENTS

H2270 H 6/2012 Le Saint et al.
2003/0012566 A1* 1/2003 Kindaichi ............ H04N 1/2112
396/56

(Continued)

FOREIGN PATENT DOCUMENTS

JP 2002-142181 A 5/2002
JP 2005-012396 A 1/2005
(Continued)

OTHER PUBLICATIONS

Bluetooth Specification of the Bluetooth System Jun. 30, 2010 pp. 1059-1101.*

(Continued)

Primary Examiner — David J Pearson
(74) Attorney, Agent, or Firm — Paratus Law Group, PLLC

(57) ABSTRACT

There is provided an integrated circuit capable of performing more secure encrypted communication using near field non-contact wireless communication. The integrated circuit including a communication processing section configured to communicate with another apparatus through non-contact communication, and an encryption information generation section configured to make a determination on generation of authentication information used to mutually authenticate the other apparatus in performing non-contact communication with the other apparatus depending on presence or absence of a history of non-contact communication with the other apparatus, before the communication processing section executes communication of encrypted information with the (Continued)

other apparatus. The integrated circuit allows more secure near field non-contact wireless communication to be performed.

24 Claims, 31 Drawing Sheets

(51) Int. Cl.
*H04W 76/10* (2018.01)
*H04W 4/80* (2018.01)
*H04L 29/06* (2006.01)
*H04L 9/32* (2006.01)
*H04W 12/02* (2009.01)

(52) U.S. Cl.
CPC ........ *H04L 9/3273* (2013.01); *H04L 63/0869* (2013.01); *H04W 4/80* (2018.02); *H04W 12/02* (2013.01); *H04W 76/10* (2018.02); *H04L 63/0492* (2013.01); *H04L 2209/805* (2013.01)

(56) References Cited

U.S. PATENT DOCUMENTS

| | | | | |
|---|---|---|---|---|
| 2003/0084287 | A1* | 5/2003 | Wang | H04L 63/0428 713/168 |
| 2005/0010769 | A1* | 1/2005 | You | G06F 21/33 713/168 |
| 2007/0073929 | A1* | 3/2007 | Takayama | H04W 36/14 710/51 |
| 2007/0123165 | A1* | 5/2007 | Sheynman | H04M 1/7253 455/41.2 |
| 2007/0171848 | A1* | 7/2007 | Fujii | H04L 63/061 370/310 |
| 2008/0102793 | A1* | 5/2008 | Ananthanarayanan | H04W 12/06 455/411 |
| 2008/0155261 | A1* | 6/2008 | Sato | H04L 9/3273 713/169 |
| 2008/0247545 | A1* | 10/2008 | Teruyama | H04L 9/0841 380/255 |
| 2009/0144550 | A1* | 6/2009 | Arunan | H04L 63/068 713/171 |
| 2010/0146277 | A1 | 6/2010 | Mochizuki et al. | |
| 2010/0306538 | A1 | 12/2010 | Thomas et al. | |
| 2011/0320535 | A1* | 12/2011 | Donaldson | H04W 4/00 709/204 |
| 2013/0005302 | A1* | 1/2013 | Ozaki | H04L 63/0876 455/411 |
| 2013/0017816 | A1* | 1/2013 | Talty | H04W 76/14 455/418 |
| 2013/0343542 | A1* | 12/2013 | Rosati | H04W 12/04 380/270 |
| 2014/0112476 | A1* | 4/2014 | Teruyama | H04L 63/0428 380/270 |
| 2014/0256251 | A1* | 9/2014 | Caceres | H04B 5/0031 455/41.1 |
| 2015/0147970 | A1* | 5/2015 | Tan | H04W 12/08 455/41.2 |

FOREIGN PATENT DOCUMENTS

| | | |
|---|---|---|
| JP | 2010-041666 A | 2/2010 |
| JP | 2010-198451 A | 9/2010 |
| JP | 2010-287964 A | 12/2010 |

OTHER PUBLICATIONS

Oct. 11, 2016, EP communication issued for related EP application No. 14774323.1.
Vedat Coskun, et al., Near Field Communication From Theory to Practice, 2012, UK, pp. i-361.
NFC-SEC-01: NFC-SEC Cryptography Standard using ECDH and AES, ECMA International, Standard ECMA-386, 2$^{nd}$ Edition, Jun. 2010, Geneva, CH, pp. i-19.
Apr. 3, 2018, Japanese Office Action issued for related JP Application No. 2015-508260.
Jul. 24, 2018, Japanese Office Action issued for related JP application No. 2015-508260.
Sep. 6, 2018, European Communication issued for related EP application No. 14774323.1.
ECMA International, High Rate Ultra Wideband PHY and MAC Standard, Standard ECMA-368, 2$^{nd}$ Edition, XP-002563778, Dec. 2007, pp. 1-344.

* cited by examiner

FIG.3

| | STORAGE SECTION 111 | CONTROLLER 110 | RF COMMUNICATION SECTION 130 |
|---|---|---|---|
| CASE 1 | CLF | CLF | CLF |
| CASE 2 | SE | CLF | CLF |
| CASE 3 | SE | SE | CLF |
| CASE 4 | SE | DH | CLF |
| CASE 5 | DH | DH | CLF |

FIG.10

| CMD 0 | CMD 1 | Byte 0 | Byte 9 | Byte 10 | Byte 11 | Byte 12 | Byte 13 | Byte 14 | Byte n |
|---|---|---|---|---|---|---|---|---|---|
| (D4) | (00) | nfcid3i0 | nfcid3i9 | DIDi | BSi | BRi | PPi | [Gi[0]] | [Gi[n]] |

FIG.11

| CMD 0 | CMD 1 | Byte 0 | ... | Byte 9 | Byte 10 | Byte 11 | Byte 12 | Byte 13 | Byte 14 | Byte 15 | ... | Byte n |
|---|---|---|---|---|---|---|---|---|---|---|---|---|
| (D5) | (01) | nfcid3t0 | ... | nfcid3t9 | DIDt | BSt | BRt | TO | PPt | [Gt[0]] | ... | [Gt[n]] |

FIG.12

| Tag | Length | Value |
|---|---|---|
| 10h | 10h | 00 11 22 33 44 55 66 77 88 99 AA BB CC DD EE FFh |

FIG.13

| Tag | Length | Value | Description |
|-----|--------|-------|-------------|
| 11h | 01h | 00h | ENCRYPTED COMMUNICATION WITH COUNTERPART DEVICE IS NOT PERFORMED |
| | | 01h | ENCRYPTED COMMUNICATION WITH COUNTERPART DEVICE IS PERFORMED (USING NFC-SEC SCH) ENCRYPT NFC-SEC SDU |
| | | 10h | ENCRYPTED COMMUNICATION WITH COUNTERPART DEVICE IS PERFORMED ENCRYPT LLC SDU |
| | | 11h | ENCRYPTED COMMUNICATION WITH COUNTERPART DEVICE IS PERFORMED ENCRYPT LLC I SDU |

FIG.14

| Tag | Length | Value |
|-----|--------|-------|
| 12h | n | SECURITY PROTOCOL NUMBER LIST |

FIG.15

| Tag | Length | Value | Description |
|---|---|---|---|
| 13h | 01h | 00h | DISAGREEMENT BETWEEN DEVICE IDS |
| | | 01h | AGREEMENT BETWEEN DEVICE IDS |

FIG.18

| PDU Type | PTYPE | Link Service Class |
|---|---|---|
| SYMM | 0000 | 1, 2, 3 |
| PAX | 0001 | 1, 2, 3 |
| AGF | 0010 | 1, 2, 3 |
| UI | 0011 | 1, 3 |
| CONNECT | 0100 | 2, 3 |
| DISC | 0101 | 1, 2, 3 |
| CC | 0110 | 2, 3 |
| DM | 0111 | 1, 2, 3 |
| FRMR | 1000 | 2, 3 |
| SNL | 1001 | 1, 2, 3 |
| reserved | 1010 | |
| reserved | 1011 | |
| I | 1100 | 2, 3 |
| RR | 1101 | 2, 3 |
| RNR | 1110 | 2, 3 |
| reserved | 1111 | |

FIG.20

| NFC-SEC-PDU | SEP | PID | NFC-SEC Payload |
|---|---|---|---|
| ACT_REQ | m | m | c |
| ACT_RES | m | p | c |
| VFY_REQ | m | p | c |
| VFY_RES | m | p | c |
| ENC | m | p | c |
| TMN | m | p | p |
| ERROR | m | p | c |

FIG.22

| Code | Name | Description |
|---|---|---|
| 0000 | ACT_REQ | Activation request to request a new service. |
| 0001 | ACT_RES | Activation response, to accept a service request. |
| 0010 | VFY_REQ | Verification request to submit check values for verification of the Sender's shared secret. |
| 0011 | VFY_RES | Verification response to submit check values for verification of the Recipient's shared secret. |
| 0100 | ENC | Encrypted packet for secure data exchange. |
| 0110 | TMN | Terminate request to terminate a service. |
| 1111 | ERROR | Error an Indication of an error. |
| Other | | RFU |

INTEGRATED CIRCUIT, COMMUNICATION METHOD, COMPUTER PROGRAM, AND COMMUNICATION APPARATUS

CROSS REFERENCE TO PRIOR APPLICATION

This application is a National Stage Patent Application of PCT International Patent Application No. PCT/JP2014/056371 (filed on Mar. 11, 2014) under 35 U.S.C. § 371, which claims priority to Japanese Patent Application No. 2013-073977 (filed on Mar. 29, 2013), which are all hereby incorporated by reference in their entirety.

TECHNICAL FIELD

The present disclosure relates to an integrated circuit, communication method, computer program, and communication apparatus.

BACKGROUND ART

Near field wireless communication systems, which perform wireless communication in a non-contact manner at a close distance, have been widely used by using IC (Integrated Circuit) cards. Such near field wireless communication systems are well known for use as electronic tickets or electronic money, for example. Further, mobile phones, which include a function of electronic tickets or electronic money by near field non-contact wireless communication, have also become widespread in recent years.

Near field wireless communication systems have spread rapidly on a global scale, and have also become international standards. For example, ISO/IEC 14443, which is a standard of proximity IC card systems, and ISO/IEC 18092, which is a standard of NFCIP (Near Field Communication Interface and Protocol)-1, are included in the international standards of near field wireless communication systems. Further, it is possible for an LLC PDU (Protocol Data Unit) defined in an NFC LLCP (NFC Forum Logical Link Control Protocol, refer to Non-Patent Literature 1), which is an upper layer protocol of ISO/IEC 18092 transport protocol, to concurrently communicate with a plurality of connections.

CITATION LIST

Non-Patent Literature

Non-Patent Literature 1: NFC Forum Logical Link Control Protocol TS 1.1

SUMMARY OF INVENTION

Technical Problem

The NFC-SEC technology that is a security option for NFCIP-1 (ISO/IEC 13157-1 and ISO/IEC 12157-2) does not have a function of performing mutual authentication between two devices. The NFC-SEC technology creates shared secret information (shared secret) only by placing two devices in close proximity to each other. Thus, in the existing NFC-SEC technology, when devices are in close proximity to each other, any unauthorized user can exchange the shared secret information to perform encrypted communication.

Therefore, according to an embodiment of the present disclosure, there is provided a novel and improved integrated circuit, communication method, computer program, and communication apparatus, capable of performing more secure encrypted communication using near field non-contact wireless communication.

Solution to Problem

According to the present disclosure, there is provided an integrated circuit including: a communication processing section configured to communicate with another apparatus through non-contact communication; and an encryption information generation section configured to make a determination on generation of authentication information used to mutually authenticate the other apparatus in performing non-contact communication with the other apparatus depending on presence or absence of a history of non-contact communication with the other apparatus, before the communication processing section executes communication of encrypted information with the other apparatus.

According to the present disclosure, there is provided a communication method including the steps of: communicating with another apparatus through non-contact communication; and making a determination on generation of authentication information used to mutually authenticate the other apparatus in performing non-contact communication with the other apparatus depending on presence or absence of a history of non-contact communication with the other apparatus, prior to execution of communication of encrypted information with the other apparatus.

According to the present disclosure, there is provided a computer program for causing a computer to execute the steps of: communicating with another apparatus through non-contact communication; and making a determination on generation of authentication information used to mutually authenticate the other apparatus in performing non-contact communication with the other apparatus depending on presence or absence of a history of non-contact communication with the other apparatus and depending on presence or absence of a history of non-contact communication with the other apparatus, prior to execution of communication of encrypted information with the other apparatus.

According to the present disclosure, there is provided a communication apparatus including: an integrated circuit including a communication processing section configured to communicate with another apparatus through non-contact communication, and an encryption information generation section configured to make a determination on generation of authentication information used to mutually authenticate the other apparatus in performing non-contact communication with the other apparatus depending on presence or absence of a history of non-contact communication with the other apparatus, before the communication processing section executes communication of encrypted information with the other apparatus; and a power supply configured to supply the integrated circuit with power.

Advantageous Effect of Invention

According to the embodiments of the present disclosure described above, it is possible to provide a novel and improved integrated circuit, communication method, computer program, and communication apparatus, capable of performing more secure encrypted communication using near field non-contact wireless communication.

BRIEF DESCRIPTION OF DRAWINGS

FIG. 3 is an explanatory diagram showing an exemplary hardware configuration of the communication apparatus 100.

FIG. 10 is an explanatory diagram showing a structure of a command ATR_REQ.

FIG. 11 is an explanatory diagram showing a structure of a command ATR_RES.

FIG. 12 is an explanatory diagram showing an example of data including device ID stored therein.

FIG. 13 is an explanatory diagram showing an example of data including security protocol indication information stored therein.

FIG. 14 is an explanatory diagram showing an example of data including security protocol capability information stored therein.

FIG. 15 is an explanatory diagram showing an example of data including a result of comparison between device IDs stored therein.

FIG. 18 is an explanatory diagram showing information stored in PTYPE field.

FIG. 20 is an explanatory diagram showing a relationship between fields used by a command of a protocol data unit of NFC-SEC.

FIG. 22 is an explanatory diagram which shows a correlation between a code stored in the SEP field and the content shown by this code.

DESCRIPTION OF EMBODIMENTS

Hereinafter, preferred embodiments of the present invention will be described in detail with reference to the appended drawings. Further, in this specification and the drawings, elements that have substantially the same function and structure are denoted with the same reference signs, and redundant explanation is omitted.

The description will be given in the following order.
<1. Embodiment of the present disclosure>
[System configuration example]
[Functional configuration example of communication apparatus]
[Operation example of communication apparatus (basic sequence)]
[Protocol and protocol message example]
[Operation example of communication apparatus (example of specific process procedure)]
<2. Conclusion>

1. EMBODIMENT OF THE PRESENT DISCLOSURE

[System Configuration Example]

Figure 1:
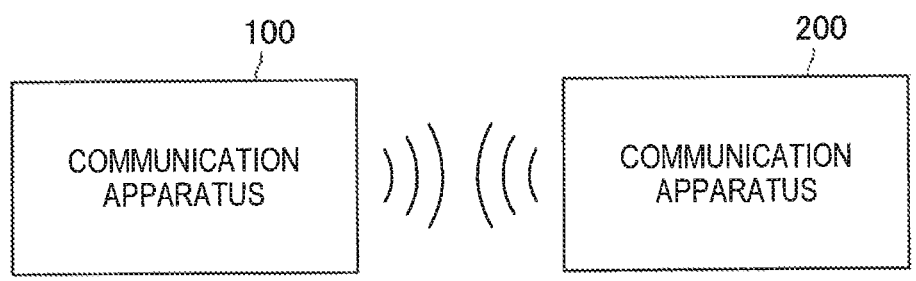
FIG. 1 is an explanatory diagram which shows a configuration example of a near field wireless communication system 1 according to an embodiment of the present disclosure.

First, a configuration example of a near field wireless communication system according to an embodiment of the present disclosure will be described. FIG. 1 is an explanatory diagram which shows a configuration example of a near field wireless communication system 1 according to an embodiment of the present disclosure. Hereinafter, a configuration example of a near field wireless communication system according to an embodiment of the present disclosure will be described by using FIG. 1.

As shown in FIG. 1, the near field wireless communication system 1 according to an embodiment of the present disclosure is constituted of communication apparatuses 100 and 200. The communication apparatuses 100 and 200 are both communication apparatuses which perform near field wireless communication by one or both of ISO/IEC 18092 and ISO/IEC 14443. Further, the communication apparatuses 100 and 200 are both communication apparatuses which perform near field wireless communication by LLCP, which is an upper layer protocol of an ISO/IEC 18092 transport protocol.

The communication apparatuses 100 and 200 can both operate as either a polling device or a listening device. The polling device forms a so-called RF (Radio Frequency) field (magnetic field) by generating electromagnetic waves, transmits a polling command for detecting the listening device as a remote target, and waits for a response from the listening device. That is, the polling device performs the operations of a PCD (Proximity Coupling Device) of ISO/IEC 14443, or the operations of an initiator for a passive mode of ISO/IEC 18092.

When the listening device receives the polling command which the polling device transmits by forming an RF field, the listening device responds by a polling response. That is, the listening device performs the operations of a PICC of ISO/IEC 14443, or the operations of a target in a passive mode of ISO/IEC 18092. Therefore, the communication apparatuses 100 and 200 can be set with the same hardware configuration.

In the description hereinafter, these configurations and operations will be described by taking up the communication apparatus 100. Further, the operations of the communication apparatus 200 will be additionally described as necessary when describing the operations of the communication apparatus 100.

Heretofore, a configuration example of a near field wireless communication system according to an embodiment of the present disclosure has been described by using FIG. 1. Next, a functional configuration example of the communication apparatus 100 according to an embodiment of the present disclosure will be described.

[Functional Configuration Example of Communication Apparatus]

Figure 2:
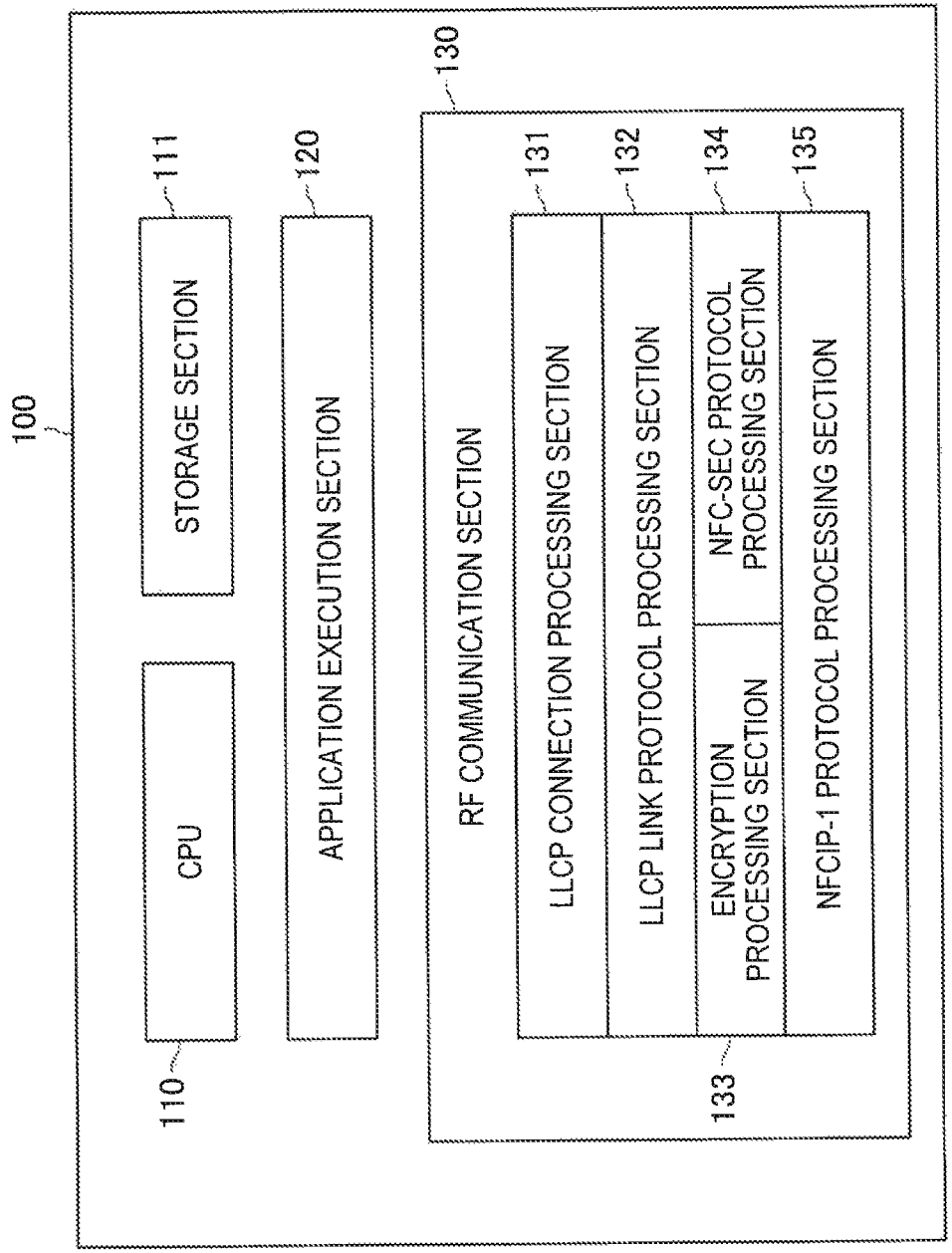
FIG. 2 is an explanatory diagram which shows a functional configuration example of a communication apparatus 100 according to an embodiment of the present disclosure.

FIG. 2 is an explanatory diagram which shows a functional configuration example of the communication apparatus 100 according to an embodiment of the present disclosure. Hereinafter, a functional configuration example of the communication apparatus 100 according to an embodiment of the present disclosure will be described by using FIG. 2.

As shown in FIG. 2, the communication apparatus 100 according to an embodiment of the present disclosure is configured to include a controller 110, a storage section 111, an application execution section 120, and an RF communication section 130. Although not shown, the communication apparatus 100 is configured to further include a power supply for supplying the RF communication section (integrated circuit) 130 with power.

The controller 110 controls the operation of the communication apparatus 100. The controller 110 may read a computer program and sequentially execute it to control the operation of the communication apparatus 100. The storage section 111 is a storage area used to store temporarily a computer program executed by the controller 110 or data used during the control by the controller 110. The storage section 111 also stores data used by the RF communication section 130.

The storage section 111 may store identification information (e.g., device ID) that can be used to uniquely identify the shared secret information and a communication counterpart. The shared secret information is information used to perform the encrypted communication and mutual authentication between the communication apparatuses 100 and 200. For this reason, the storage section 111 is preferably provided with tamper-resistant feature to prevent the contents of the communication apparatus 100 from being read from the outside.

The application execution section 120 executes applications which use an LLCP. The application execution section 120 may execute a plurality of applications concurrently. The applications executed by the application execution section 120 each have individual service access points (SAP).

The RF communication section 130 executes near field communication based on a predetermined frequency. The RF communication section 130 is configured to include an LLCP connection processing section 131, an LLCP link protocol processing section 132, an encryption processing section 133, an NFC-SEC protocol processing section 134, and an NFCIP-1 protocol processing section 135, as shown in FIG. 2.

The LLCP connection processing section 131 executes data transfer between corresponding applications (for example, applications executed by the application execution section 120), in accordance with a specified transfer source service access point (SSAP) and destination service access point (DSAP).

The LLCP link protocol processing section 132 executes activation (that is, activation of the NFCIP-1 protocol), maintenance, and deactivation of an LLCP link.

The encryption processing section 133 executes encryption processes provided by encryption systems other than NFC-SEC, when near field non-contact wireless communication encrypted between the communication apparatus 100 and the communication apparatus 200 is executed. The encryption processing section 133 executes, as an encryption process, for example, the encryption of data columns to be communicated, the generation of a message authentication code (MAC), the generation of random numbers, or the like.

The NFC-SEC protocol processing section 134 processes a protocol provided by NFC-SEC. There is an SSE (Shared SEcret service) and an SCH (Secure CHannel service) in the protocol provided by NFC-SEC. The SSE is a service which generates shared secret information between devices using NFC-SEC, and is shared between the devices. Further, the SCH is a service which executes encryption communication between devices using NFC-SEC by using the shared secret information shared by the SSE, and communication of all channels is encrypted. The NFC-SEC protocol processing section 134 is one example of an encryption information generation section according to an embodiment of the present disclosure. The NFCIP-1 protocol processing section 135 processes the protocol provided by the NFCIP-1.

The communication apparatus 100 according to an embodiment of the present disclosure having the configuration as shown in FIG. 2 allows near field communication with the communication apparatus 200 to be executed by the RF communication section 130.

The RF communication section 130 shown in FIG. 2 may be implemented as a contactless front end (CLF) on a single IC chip. In addition to the RF communication section 130 shown in FIG. 2, the controller 110 may be implemented as a CLF on a single IC chip. In addition to the RF communication section 130 and the controller 110, the storage section 111 may be implemented as a CLF on a single IC chip.

Besides this, the hardware configuration of the communication apparatus 100 according to an embodiment of the present disclosure may employ various structural forms. For example, when the communication apparatus 100 shown in FIG. 2 is configured to include a CLF, a device host (DH), and a secure element (SE), the hardware configuration of the communication apparatus 100 may employ any one of forms listed in FIG. 3.

In Case 1 of FIG. 3, the CLF performs all functions. In other words, information is securely stored within the CLF. In Case 2 of FIG. 3, the SE stores information and the CLF performs other processes. In Case 3 of FIG. 3, the CLF performs RF communication and the SE performs control of the communication apparatus 100 and storage of information. In Case 4 of FIG. 3, the CLF performs RF communication, the DH performs control of the communication apparatus 100, and the SE performs storage of information. In Case 5 of FIG. 3, the CLF performs RF communication, the DH securely stores information by performing control of the communication apparatus 100 and storage of information.

Although not shown in FIG. 2, the communication apparatus 100 according to an embodiment of the present disclosure may be provided with an antenna for performing near field non-contact wireless communication with another device at a predetermined frequency. Such an antenna may be provided, for example, in the RF communication section 130.

The functional configuration example of the communication apparatus 100 according to an embodiment of the present disclosure has been described with reference to FIG. 2. An exemplary operation of the communication apparatus 100 according to an embodiment of the present disclosure will be described.

[Operation Example of Communication Apparatus (Basic Sequence)]

Figure 4:
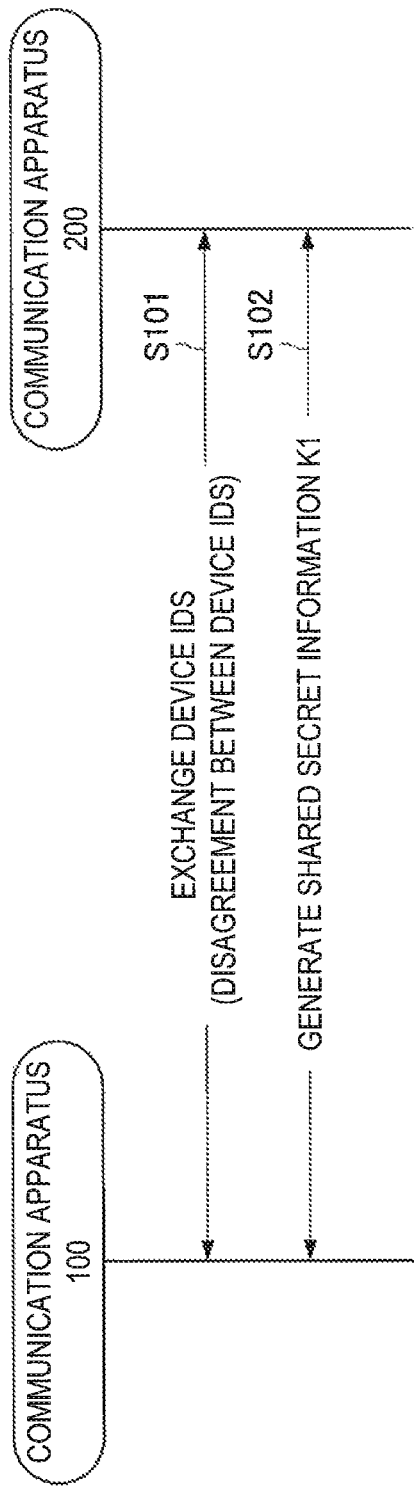
FIG. 4 is a flow chart showing an exemplary operation between the communication apparatus 100 and a communication apparatus 200 according to an embodiment of the present disclosure.

An example of a basic sequence in a case where the two communication apparatuses 100 and 200 perform secure mutual authentication therebetween will be described. FIG. 4 is a flow chart illustrating an exemplary operation of the communication apparatuses 100 and 200 according to an embodiment of the present disclosure. For example, the operation shown in FIG. 4 indicates that the LLCP allows execution of the RF communication section 130. An exemplary operation of the communication apparatuses 100 and 200 according to an embodiment of the present disclosure will be described with reference to FIG. 4.

When RF communication is performed by placing the communication apparatuses 100 and 200 in close proximity to each other, the communication apparatuses 100 and 200 exchange individual devices IDs stored in their respective storage sections 111 by RF communication (step S101). As shown in the basic sequence of FIG. 4, for example, if the device ID received from the communication apparatus 200 does not match the device ID stored in the communication apparatus 100, or if the device ID received from the communication apparatus 100 does not match the device ID stored in the communication apparatus 200, it is determined that initial RF communication is performed between the communication apparatuses 100 and 200. When it is determined that the initial RF communication is performed between the communication apparatuses 100 and 200, the communication apparatuses 100 and 200 generate shared secret information K1 based on the NFC-SEC (step S102). The generated shared secret information K1 is associated with each of the device IDs used to identify the communication counterpart and is stored in the communication apparatuses 100 and 200. The communication apparatuses 100 and 200 temporarily terminate the RF communication after the generation of the shared secret information K1 based on the NFC-SEC.

The communication apparatuses 100 and 200 may be allowed to determine whether identity of their individual counterparts exchanging the device IDs in step S101 is stored. For example, a use case may be envisaged in which the user checks whether a communication counterpart is reliable with his own eyes and then operates the user interface displayed on the communication apparatus 100.

The exemplary operation of the communication apparatuses 100 and 200 when a device ID obtained upon exchange of device IDs does not match a stored device ID has been described with reference to FIG. 4.

Figure 5:
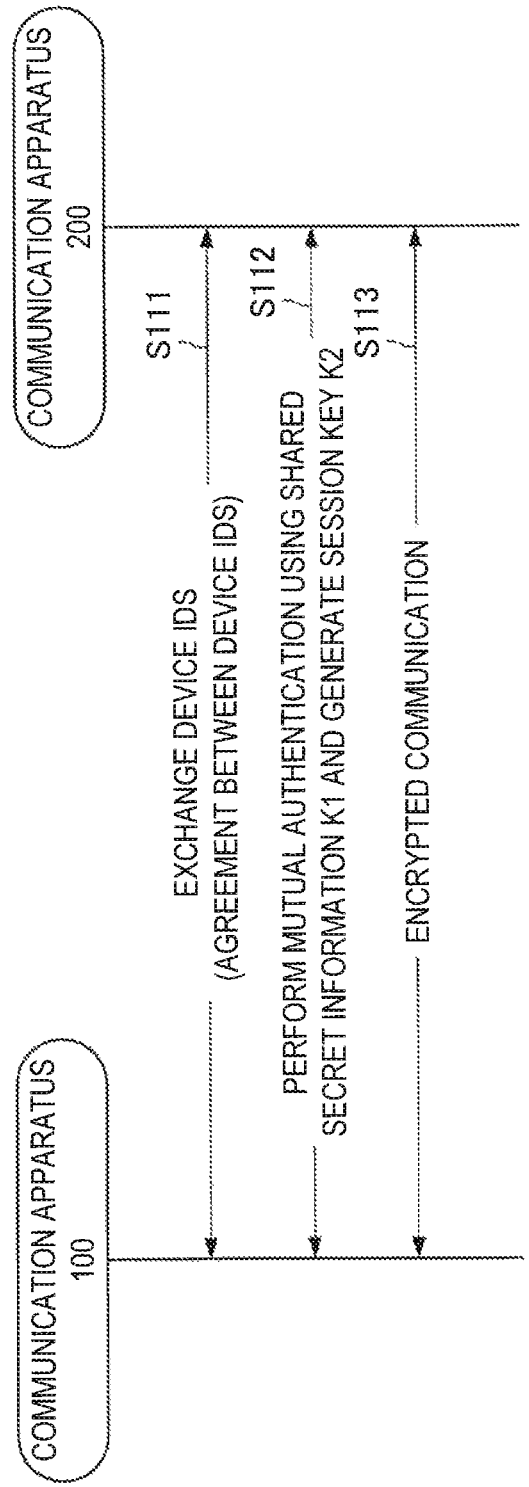
FIG. 5 is a flow chart showing an exemplary operation between the communication apparatuses 100 and 200 according to an embodiment of the present disclosure.

FIG. 5 is a flow chart illustrating an exemplary operation of the communication apparatuses 100 and 200 according to an embodiment of the present disclosure. For example, the operation shown in FIG. 5 indicates that the LLCP allows execution of the RF communication section 130. An exemplary operation of the communication apparatuses 100 and 200 according to an embodiment of the present disclosure will be described with reference to FIG. 5.

When RF communication is performed by placing the communication apparatuses 100 and 200 in close proximity to each other, the communication apparatuses 100 and 200 exchange individual devices IDs stored in their respective storage sections 111 using RF communication (step S111). As shown in the sequence of FIG. 5, for example, if the device ID received from the communication apparatus 200 does not match the device ID stored in the communication apparatus 100, and if the device ID received from the communication apparatus 100 matches the device ID stored in the communication apparatus 200, it is determined that RF communication between the communication apparatuses 100 and 200 has been previously performed and the shared secret information K1 based on the NFC-SEC has been previously generated. When it is determined that the RF communication has been previously performed between the communication apparatuses 100 and 200, each of the communication apparatuses 100 and 200 sets shared secret information K1 as a secret key, performs mutual authentication, and generates a session key K2 after execution of the mutual authentication (step S112). The communication apparatuses 100 and 200 perform encrypted RF communication with each other after the generation of the session key K2 (step S113).

The exemplary operation of the communication apparatuses 100 and 200 when a device ID obtained upon the exchange of device IDs does not match a stored device ID has been described with reference to FIG. 5.

If it is determined that the device IDs match each other in only one direction, the mutual authentication is unsuccessful at the time of mutual authentication in step S112. The determination that the device IDs match each other in only one direction may be assumed occur, for example, when the device ID of the communication apparatus 100 is discarded in the communication apparatus 200. A sequence example when considering such a case will be described.

Figure 6:
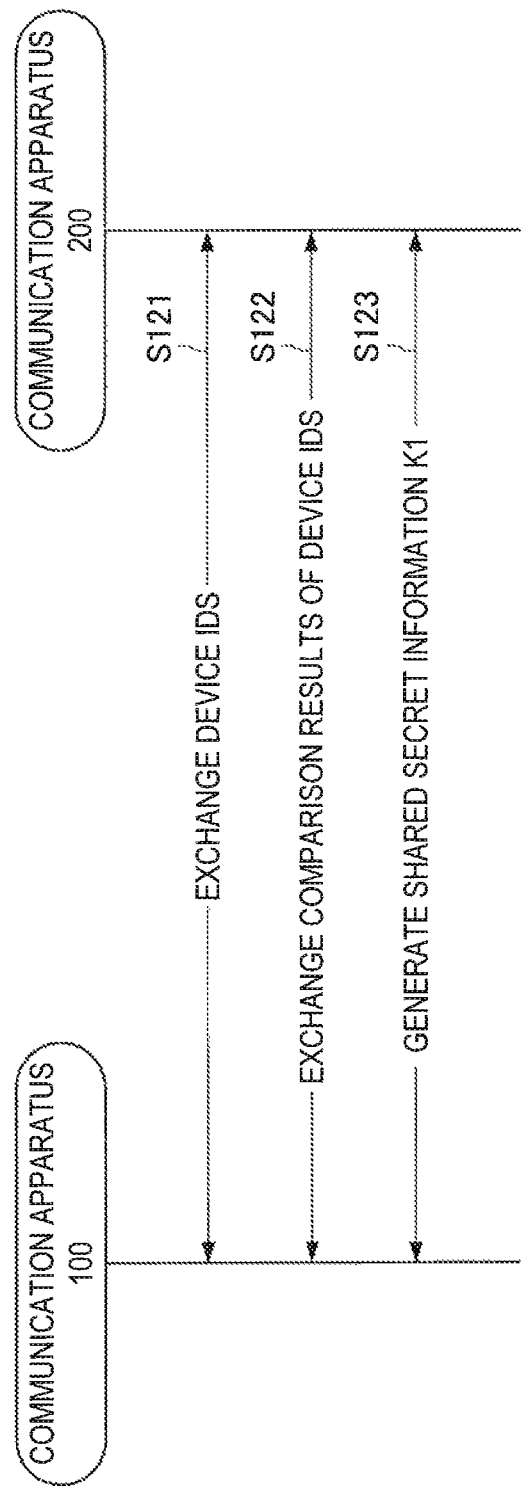
FIG. 6 is a flow chart showing an exemplary operation between the communication apparatuses 100 and 200 according to an embodiment of the present disclosure.

FIG. 6 is a flow chart illustrating an exemplary operation of the communication apparatuses 100 and 200 according to an embodiment of the present disclosure. The flow chart shown in FIG. 6 is an exemplary sequence of a case where comparison between an obtained device ID and a stored device ID is performed in each of the communication apparatuses 100 and 200 after the exchange of device IDs. An exemplary operation of the communication apparatuses 100 and 200 according to an embodiment of the present disclosure will be described with reference to FIG. 6.

When RF communication is performed by placing the communication apparatuses 100 and 200 in close proximity to each other, the communication apparatuses 100 and 200 exchange individual devices IDs stored in their respective storage sections 111 using RF communication (step S121). When the device IDs are exchanged, the communication apparatuses 100 and 200 exchange individual results obtained by comparing the device IDs with each other (step S122).

If it is determined in step S122 that the device IDs do not match each other when the individual comparison results obtained by comparing the device IDs are exchanged, the RF communication between the communication apparatuses 100 and 200 is determined to be initially performed. When the RF communication between the communication apparatuses 100 and 200 is determined to be initially performed, the communication apparatuses 100 and 200 generate shared secret information K1 based on the NFC-SEC (step S123). The communication apparatuses 100 and 200 temporarily terminate the RF communication after the generation of the shared secret information K1 based on the NFC-SEC.

Figure 7:
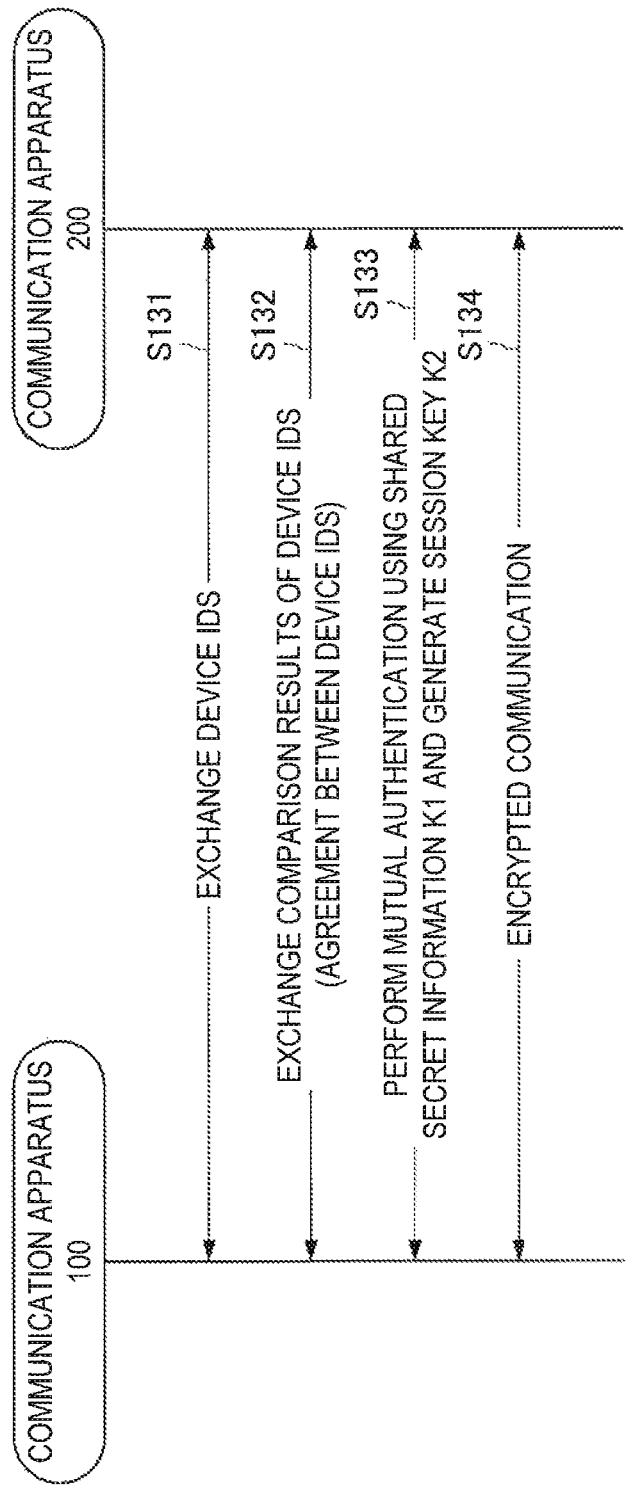
FIG. 7 is a flow chart showing an exemplary operation between the communication apparatuses 100 and 200 according to an embodiment of the present disclosure.

FIG. 7 is a flow chart illustrating an exemplary operation of the communication apparatuses 100 and 200 according to an embodiment of the present disclosure. The flow chart shown in FIG. 7 is an exemplary sequence of a case where comparison between an obtained device ID and a stored device ID is performed in each of the communication apparatuses 100 and 200 after the exchange of device IDs. An exemplary operation of the communication apparatuses 100 and 200 according to an embodiment of the present disclosure will be described with reference to FIG. 7.

When RF communication is performed by placing the communication apparatuses 100 and 200 in close proximity to each other, the communication apparatuses 100 and 200 exchange individual devices IDs stored in their respective storage sections 111 using RF communication (step S131). When the device IDs are exchanged, the communication apparatuses 100 and 200 exchange individual results obtained by comparing the device IDs with each other (step S132).

If it is determined in step S132 that the device IDs match each other when the individual comparison results obtained by comparing the device IDs are exchanged, it is determined that RF communication between the communication apparatuses 100 and 200 has been previously performed and the shared secret information K1 based on the NFC-SEC has been previously generated. When it is determined that the RF communication has been previously performed between the communication apparatuses 100 and 200, each of the communication apparatuses 100 and 200 sets the shared secret information K1 as a secret key, performs mutual authentication, and generates a session key K2 after execution of the mutual authentication (step S133). The communication apparatuses 100 and 200 perform encrypted RF communication with each other after the generation of the session key K2 (step S134).

In this way, the communication apparatuses 100 and 200 compare between the obtained device ID and the stored device ID and exchange the comparison results after the exchange of device IDs, and thus it is possible to avoid a failure to perform mutual authentication at the time of mutual authentication.

This operation makes it possible to execute securely the mutual authentication using the NFC-SEC when the communication apparatus 100 according to an embodiment of the present disclosure executes the near field communication with another communication apparatus (e.g., communication apparatus 200). In other words, the communication apparatus 100 according to an embodiment of the present disclosure can execute the encrypted communication with the other party after the other party exchanges the device ID previously and determines that the shared secret information K1 based on the NFC-SEC is generated previously.

An example of the basic sequence in a case where the two communication apparatuses 100 and 200 perform secure mutual authentication therebetween has been described. An exemplary operation performed by the communication apparatus 100 according to an embodiment of the present disclosure will be described in more detail.

[Protocol and Protocol Message Example]

An exemplary protocol used in the near field communication executed by the communication apparatus 100 according to an embodiment of the present disclosure and an exemplary protocol message used in the protocol will be described. Then, an exemplary operation performed by the communication apparatus 100 according to an embodiment of the present disclosure will be described in more detail.

Figure 8:
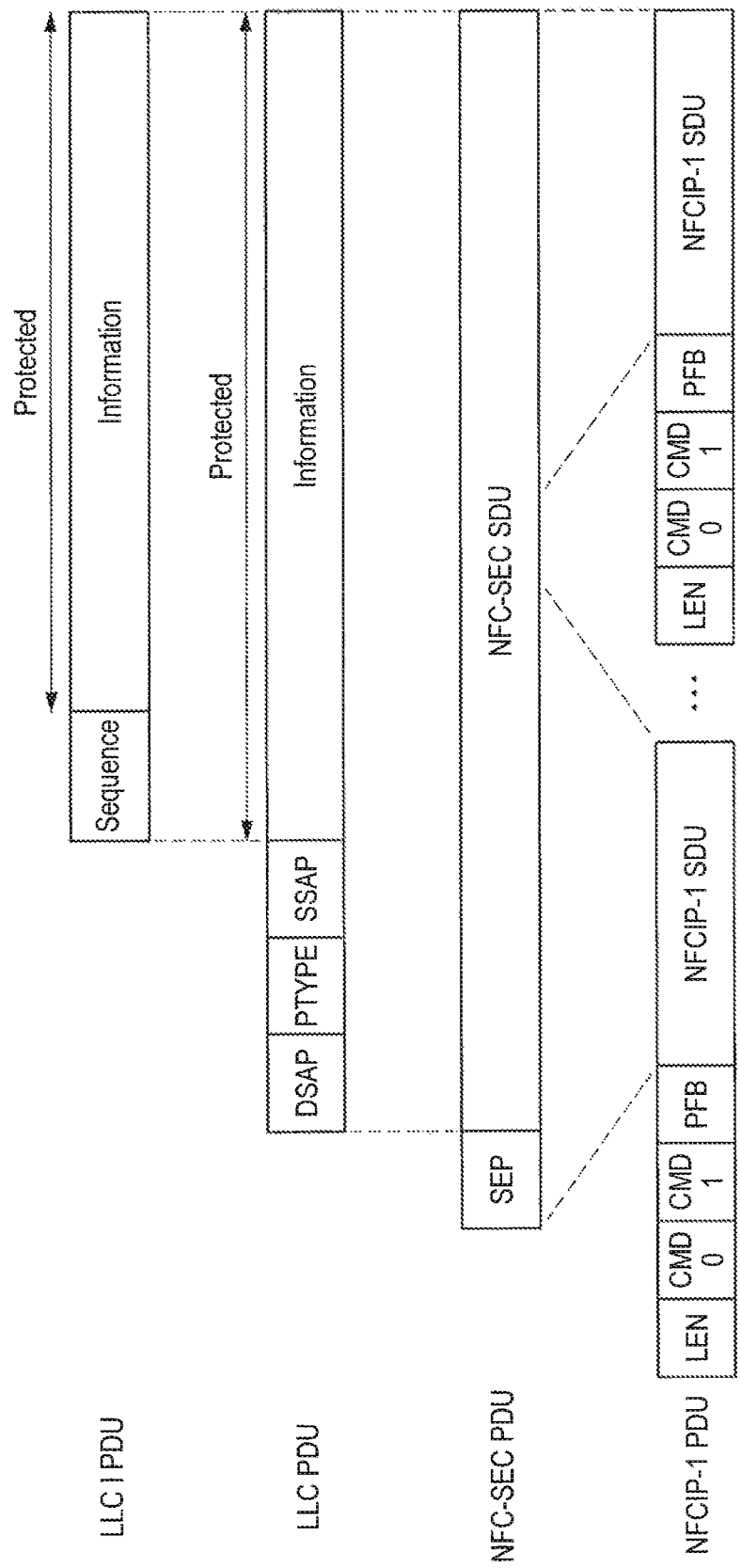
FIG. 8 is an explanatory diagram showing an example of a protocol layer and protocol data to be encrypted.

FIG. 8 is an explanatory diagram showing an example of protocol layer and protocol data to be encrypted of a protocol used in the near field communication executed by the communication apparatus 100 according to an embodiment of the present disclosure.

As shown in FIG. 8, the NFC-SEC layer is above the NFCIP-1 layer, and the LLCP layer is above the NFC-SEC layer. The LLCP layer has a link layer and a transport layer. The LLC PDU is treated as the link layer, and the LLC I PDU is treated as the transport layer (connection-oriented transport).

Another session key, which is generated by a key sharing using a key generated by the NFC-SEC as a secret key, can be used to encrypt the upper layer protocol data. For example, another session key, which is generated by a key sharing using a key generated by the NFC-SEC as a secret key, may be used to encrypt an information field of the LLC PDU or LLC I PDU.

Figure 9:
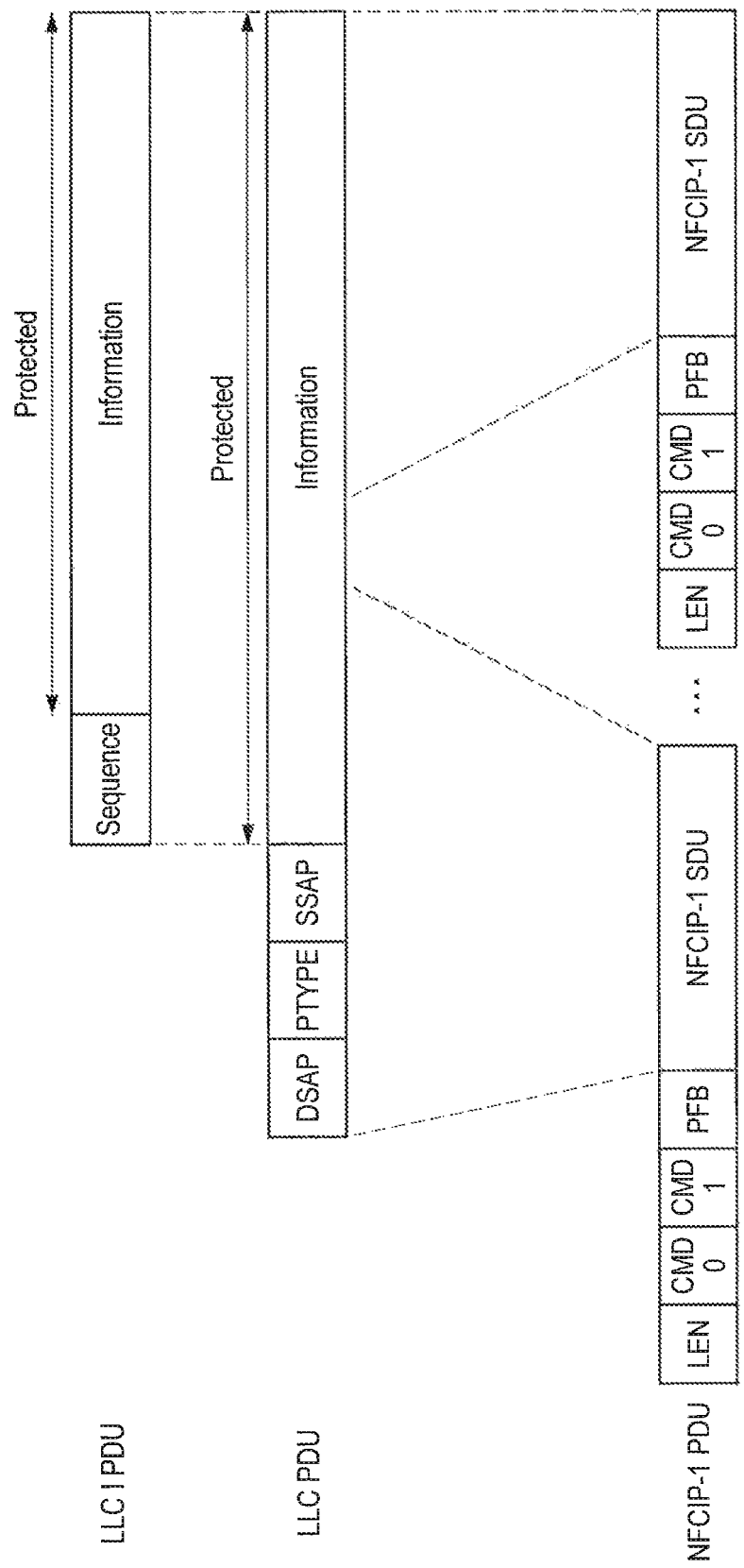
FIG. 9 is an explanatory diagram showing an example of a protocol layer and protocol data to be encrypted.

The NFC-SEC may not be necessarily used during the key sharing. When the NFC-SEC is not used for the key sharing, the NFC-SEC PDU shown in FIG. 8 is not used. Thus, when the NFC-SEC is not used for the key sharing, the key sharing is performed by using the LLC PDU capable of executing communication concurrently with establishing a plurality of connections. FIG. 9 is an explanatory diagram showing an example of protocol layer and protocol data to be encrypted of a protocol used in the near field communication executed by the communication apparatus 100 according to an embodiment of the present disclosure, and illustrates a case where the NFC-SEC is not used for the key sharing.

The communication apparatus 100 uses the general bytes of ATR_REQ and ATR_RES defined in ISO/IEC 18092 to exchange the device IDs and security protocol indication information.

FIG. 10 is an explanatory diagram which shows a structure of a command ATR_REQ, which is a request command prepared by ISO/IEC 18092. The command ATR_REQ is transmitted to a target, at the time when an initiator notifies attribute information (specifications) of itself to the target and requests attribute information of the target. Here, there are transfer rates or the like of data, which can be transmitted or received by this initiator or target, as attribute information of the initiator or the target. Note that, other than attribute information of the initiator, an NFCID or the like which specifies this initiator is arranged in the command ATR_REQ, and the target recognizes the attribute information of the initiator and the NFCID by receiving the command ATR_REQ.

As shown in FIG. 10, the command ATR_REQ is constituted of, from the head (the left side within FIG. 10), a CMD 0 field, a CMD 1 field, and Byte 0 to Byte 14+n fields (n is an integer value of 0 or above).

The values "D4" and "00", which show that this command is a command ATR_REQ, are stored in the CMD 0 field and the CMD 1 field, respectively. NFCID (nfcid3$i$0 to nfcid3$i$9), which specify the communication apparatus (initiator) transmitting this command ATR_REQ, are stored in the Byte 0 to Byte 9 fields. DIDi, which is the device ID of the initiator transmitting this command ATR_REQ, is set in the Byte 10 field. The Byte 10 field is also called a DIDi field.

A bit rate (transfer rate) BSi at which the initiator transmitting this command ATR_REQ can transmit data is set in the Byte 11 field. A bit rate (transfer rate) BRi at which the initiator transmitting this command ATR_REQ can receive data is set in the Byte 12 field.

An option parameter PPi for the initiator transmitting this command ATR_REQ is set in the Byte 13 field. For example, a parameter which shows that the device itself is capable of performing processes by NFC-SEC is set in this Byte 13 field.

The Byte 14 to Byte 14+n fields are each fields in which various types of information specified by a designer or the like are set, and are fields which are prepared as options. The value n is capable of being changed by the designer or the like, and is an integer value of 0 or above. This value n is set in the PPi field, such as described later. Hereinafter, each of the n number of Gi fields will be called Gi[0] to Gi[n] fields in this arrangement order (the order from the left side within FIG. 10).

FIG. 11 is an explanatory diagram which shows a structure of a command ATR_RES, which is a response command prepared by ISO/IEC 18092. In the case where the target receives a command ATR_REQ, the command ATR_RES is transmitted to the initiator as a response to this command ATR_REQ. Attribute information of the target, an NFCID, or the like is arranged in the command ATR_RES.

As shown in FIG. 11, the command ATR_RES is constituted of, from the head (the left side within FIG. 11), a CMD 0 field, a CMD 1 field, and Byte 0 to Byte n+15 fields (n is an integer value of 0 or above).

The values "D5" and "01", which show that this command is a command ATR_RES, are stored in the CMD 0 field and the CMD 1 field, respectively. Data similar to that of the Byte 0 to Byte 12 fields of the command ATR_REQ described above are set in the Byte 0 to Byte 12 fields. That is, NFCID, which specify the device transmitting this command ATR_RES, that is, the target, are stored in the Byte 0 to Byte 9 fields. A device ID which specifies the initiator transmitting this command ATR_REQ, or zero, is set in the Byte 10 field. The Byte 10 field is also called a DIDt field. A bit rate (transfer rate) BSt at which the target transmitting this command ATR_RES can transmit data is set in the Byte 11 field. A bit rate (transfer rate) BRt at which the target transmitting this command ATR_RES can receive data is set in the Byte 12 field. A value TO for a time-out of the target is set in the Byte 13 field.

The Byte 14 field is similar to that of the Byte 13 field of the command ATR_REQ. That is, an option parameter PPt for the target transmitting this command ATR_RES is set in the Byte 14 field. Note that hereinafter, the Byte 14 field of the command ATR_RES will also be called a PPt field.

The Byte 15 to Byte 15+n fields are each the same as those of the Byte 14 to Byte 14+n fields of the command ATR_REQ. That is, the Byte 15 to Byte 15+n fields are each fields in which various types of information specified by applications, settings or the like of an upper layer are set, and are fields prepared as options. The value n is capable of being changed by the designer or the like, and is an integer value of 0 or above. Hereinafter, each of the n number of Gt fields will be called Gt[0] to Gt[n] fields in this arrangement order (in the order from the left side within FIG. 11).

In an embodiment of the present disclosure, for the ATR_REQ, the Gi[n] contains a device ID and security protocol indication information to be notified to a communication counterpart. For the ATR_RES, the Gt[n] contains a device ID and security protocol indication information to be notified to a communication counterpart. These pieces of information may be exchanged using the LLC PAX PDU.

A device ID used in the present embodiment may be an ID unique to an IC chip. In other words, a device ID used in the present embodiment may be identifiable by a manufacturer using a value assigned by ISO/IEC JTC 1/SC 17 N 4140. For example, a device ID used in the present embodiment may be stored in the ATR_REQ and ATR_RES in a format of type-length-value (TLV) as shown in FIG. 12.

The above-mentioned security protocol indication information is information indicating whether the encrypted communication is performed with the communication counterpart device, or is information indicating a method of generating a session key and an encryption range. The security protocol indication information may be stored in the ATR_REQ and ATR_RES, for example, using the TLV as shown in FIG. 13. The value indicated by the security protocol indication information is referred to as security protocol number.

The security protocol may include a key sharing method (e.g., the method defined in ISO/IEC 13157-2), a mutual authentication method (e.g., the method based on ISO/IEC 9798-2), and a communication encryption method (e.g., the method defined in ISO/IEC 18033 or ISO/IEC 29192).

In an embodiment of the present disclosure, when the device ID and security protocol indication information are exchanged using PAX PDU, security protocol capability information of a device itself, as shown in FIG. 14, that is, information about which security protocol can be used is provided to a communication counterpart to prompt the communication counterpart to select a security protocol to be used.

The comparison between an obtained device ID and a stored device ID is performed in each of the communication apparatuses. Thus, there may be cases where both the device IDs match each other in one communication apparatus but both the device IDs do not match each other in the other communication apparatus. As described above and shown in FIGS. 6 and 7, the notification of a comparison result obtained by comparing between the obtained device ID and the stored device ID to a communication counterpart can eliminate the necessity of initiating the mutual authentication that is expected to be unsuccessful. For example, information about the comparison result of the device IDs may be notified to a communication counterpart using PAX PDU in the format of TLV shown in FIG. 15.

For the communication apparatuses 100 and 200 according to an embodiment of the present disclosure to exchange data after the exchange of ATR_REQ and ATR_RES, the communication apparatuses 100 and 200 use DEP_REQ and DEP_RES configured for ISO/IEC 18092.

Figure 16:
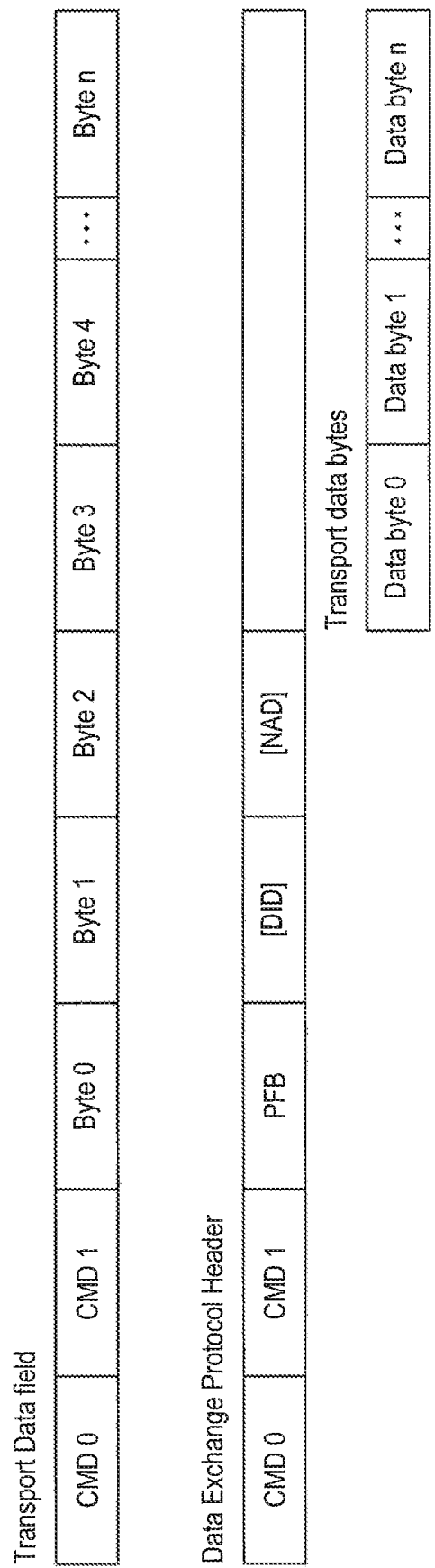
FIG. 16 is an explanatory diagram showing a structure of a command DEP_REQ and command DEP_RES.

FIG. 16 is an explanatory diagram which shows a structure of a command DEP_REQ, which is a request command, and a command DEP_RES, which is a response command, prepared by ISO/IEC 18092. The command DEP_REQ is transmitted at the time when the initiator performs transmission/reception (data exchange with the target) of data (so-called actual data), and the data to be transmitted to the target is arranged in here. The command DEP_RES is transmitted by the target as a response to the command DEP_REQ, and the data to be transmitted to the initiator is arranged in here. Therefore, data is transmitted from the initiator to the target by the command DEP_REQ, and data is transmitted from the target to the initiator by the command DEP_RES which is a response to this command DEP_REQ.

Figure 17:
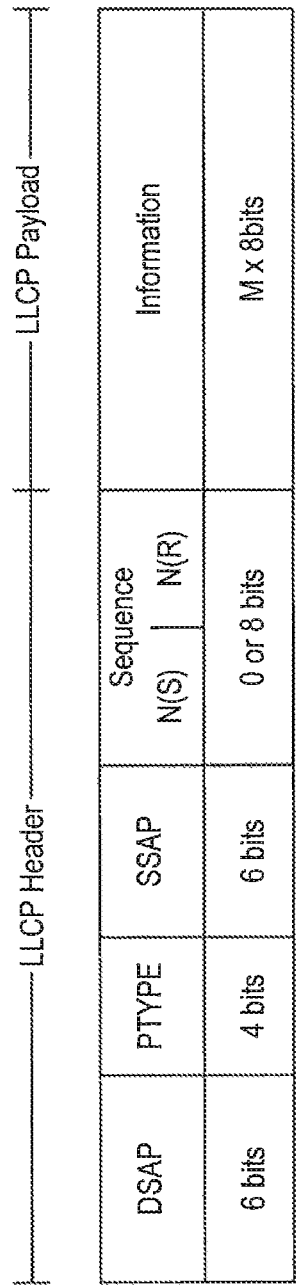
FIG. 17 is an explanatory diagram showing a structure of LLC PDU.

LLCP is one example of a layer above the NFC-SEC. FIG. 17 is an explanatory diagram which shows a structure of an LLC PDU. As shown in FIG. 17, the LLC PDU is constituted of a DSAP field, a PTYPE (Payload data unit type) field, an SSAP field, a Sequence field, and an Information field. The DSAP field, the PTYPE field, the SSAP field, and the Sequence field are an LLCP Header, and the Information field is an LLCP Payload.

The address of the DSAP is stored in the DSAP field. The type of PDU is stored in the PTYPE field. The type of PDU is defined in the NFC Forum Logical Link Control Protocol, and a value corresponding to the type of this PDU is stored. The address of the SSAP is stored in the SSAP field. The sequence number of the LLC PDU is stored in the Sequence field. Information transferred by the LLC PDU is stored in the Information field.

FIG. 18 is an explanatory diagram showing information stored in the PTYPE field in the structure of LLC PDU shown in FIG. 17. The "PTYPE" in FIG. 18 is a value stored in the PTYPE shown in FIG. 17. The values listed in FIG. 18 are defined in the NFC Forum Logical Link Control Protocol TS.

Figure 19:
FIG. 19 is an explanatory diagram which shows a structure of a protocol data unit of NFC-SEC.

The communication apparatuses 100 and 200 according to an embodiment of the present disclosure use ACT_REQ, ACT_RES, VFY_REQ, and VFY_RES configured for ISO/IEC 13157-1 to generate shared secret information. FIG. 19 is an explanatory diagram which shows a structure of a protocol data unit of NFC-SEC. As shown in FIG. 19, the protocol data unit of NFC-SEC is constituted of each field of an SEP (Secure Exchange Protocol), a PID (Protocol Identifier), and an NFC-SEC Payload.

Data, such as the type of protocol data unit of NFC-SEC and which of SSE and SCH is used, is stored in the SEP field. FIG. 20 is an explanatory diagram showing the relationship between fields used by each command of the protocol data unit of NFC-SEC. In FIG. 20, m denotes that the storage of value is mandatory, p denotes that the storage of value is prohibited, and c denotes that the storage of conditional value is acceptable.

Figure 21:
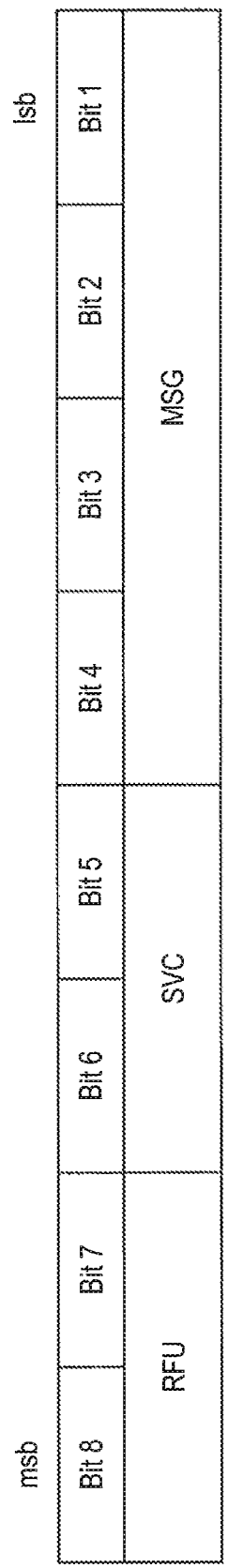
FIG. 21 is an explanatory diagram showing bit allocation in SEP field.

FIG. 21 is an explanatory diagram showing bit allocation in SEP field. FIG. 22 is an explanatory diagram which shows a correlation between codes stored in the SEP field and the content shown by these codes. A PID used by an encryption process by NFC-SEC is stored in the PID field. Data used by an encryption process by NFC-SEC is stored in the NFC-SEC Payload field.

The mutual authentication between the communication apparatuses 100 and 200 using the shared secret information K1 generated by NFC-SEC employs LLC SAC PDU (security activation PDU). In an embodiment of the present disclosure, the PTYPE field of the PDU is set to "1010b". Table 1 below indicates an example of parameters in a case where the mutual authentication is executed between the communication apparatuses 100 and 200 using the LLC SAC PDU.

TABLE 1

| LLC SAC PDU | | | |
|---|---|---|---|
| DSAP | PTYPE | SSAP | Parameter list |
| 6 bit | 4 bit 1010 | 6 bit | only TLV elements below can be stored SK1_REQ TLV SK1_RES TLV SK2_REQ TLV SK2_RES TLV SA1_REQ TLV SA1_RES TLV SA2_REQ TLV SA2_RES TLV |

In Table 1, SK1_REQ TLV, SK1_RES TLV, SK2_REQ TLV, and SK2_RES TLV are parameters for key sharing by the LLC SAC PDU. Table 2 below indicates an example of parameters for key sharing to be exchanged as SK1_REQ TLV, SK1_RES TLV, SK2_REQ TLV, and SK2 RES TLV.

TABLE 2

| Parameters for key sharing | | | |
|---|---|---|---|
| Tag | Len | Value | Description |
| 20 h | X | X | SK1_REQ TLV (key agreement) QA ∥ NA |
| 21 h | X | X | SK1_RES TLV (key agreement) QB ∥ NB |
| 22 h | X | X | SK2_REQ TLV (key confirmation) MacTagA |
| 23 h | X | X | SK2_RES TLV (key confirmation) MacTagB |

In the parameters listed in Table 2, Len and Value use a value defined in the security protocol corresponding to the security protocol number. Parameters listed in the item Description may be parameters in a case where the key sharing and key confirmation defined in the ISO/IEC 13157-2 are used.

In Table 1, SA1_REQ TLV, SA1_RES TLV, SA2_REQ TLV, and SA2_RES TLV are parameters for executing the mutual authentication by the LLC SAC PDU. Table 3 below indicates parameters for the mutual authentication to be exchanged as SA1_REQ TLV, SA1_RES TLV, SA2_REQ TLV, and SA2_RES TLV.

TABLE 3

| Parameters for mutual authentication | | | |
|---|---|---|---|
| Tag | Len | Value | Description |
| 30 h | X | X | SA1_REQ TLV RB ∥ Text1 |
| 31 h | X | X | SA1_RES TLV Text3 ∥ $e_{KAB}$(RA∥RB∥IB∥Text2) |
| 32 h | X | X | SA2_REQ TLV Text5 ∥ $e_{KAB}$(RB∥RA∥Test4) |
| 33 h | X | X | SA2_RES TLV Success or failure of mutual authentication |

In the parameters listed in Table 2, Len and Value use a value defined in the security protocol corresponding to the security protocol number. In the parameters listed in Table 2, the parameters listed in the item Description may be parameters in a case where three-pass authentication defined in ISO/IEC 9798-2 is used. For four-pass authentication, other parameters are used.

The encrypted communication in the LLC link layer between the communication apparatuses 100 and 200 that are mutually authenticated by the shared secret information K1 generated by NFC-SEC uses LLC PUI PDU (protected unnumbered information). In the present embodiment, the PTYPE field of the PDU is set to "101b". Table 4 below indicates an example of a parameter in a case where the encrypted communication in the LLC link layer between the communication apparatuses 100 and 200 is executed using the LLC PUI PDU.

TABLE 4

| LLC PUI PDU | | | |
|---|---|---|---|
| DSAP | PTYPE | SSAP | Information |
| 6 bit | 4 bit 1011 | 6 bit | dependence on security protocol |

The information field shown in Table 4 is defined by a security protocol corresponding to the security protocol number that is exchanged in advance, and is dependent on the security protocol for the encrypted communication.

An exemplary protocol used in the near field communication executed by the communication apparatus 100 according to an embodiment of the present disclosure and an exemplary protocol message used in the protocol have been described. An exemplary operation of the communication apparatus 100 according to an embodiment of the present disclosure will be described in more detail.

[Operation Example of Communication Apparatus (Example of Specific Process Procedure)]

An exemplary operation of the communication apparatus 100 according to an embodiment shows two possible cases. The first case is that the communication apparatus 100 is instructed to execute the encrypted communication as a first operation. The communication apparatus 100 exchanges a device ID and security protocol indication information using the ATR_REQ and ATR_RES. The second case is that the communication apparatus 100 is instructed to execute the encrypted communication as the subsequent operation. The communication apparatus 100 exchanges the device ID and security protocol indication information using the LLC PAX PDU. In the following description, the former is referred to as Case 1, and the latter is referred to as Case 2.

Figure 23:
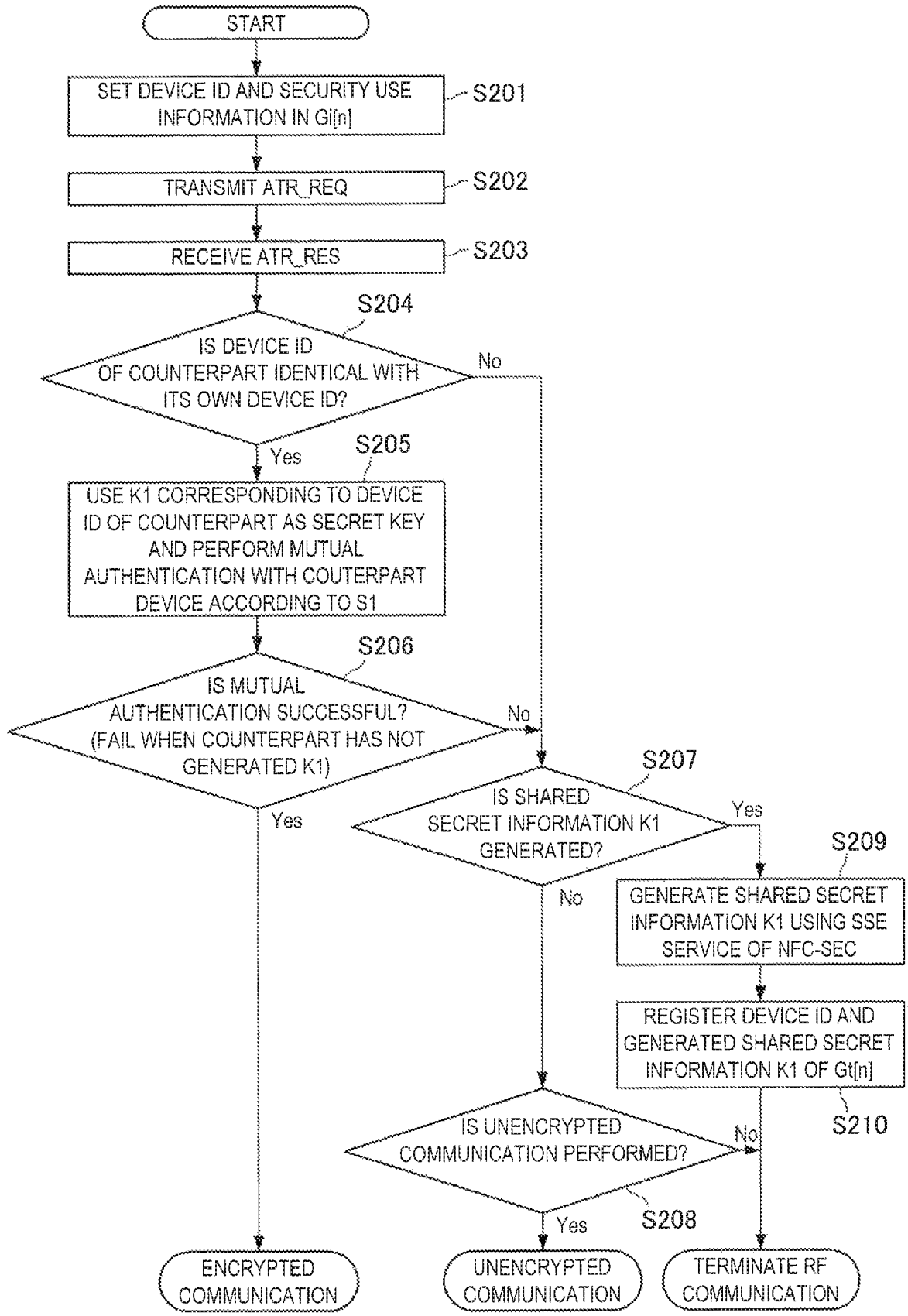
FIG. 23 is a flow chart which shows an operation example of the communication apparatus 100 according to an embodiment of the present disclosure.

FIG. 23 is a flow chart showing an operation example of the communication apparatus 100 according to an embodiment of the present disclosure. FIG. 23 illustrates an exemplary operation of the communication apparatus 100 when the communication apparatus 100 operates as an initiator in the Case 1. An exemplary operation of the communication apparatus 100 according to an embodiment of the present disclosure will be described with reference to FIG. 23.

When the communication apparatus 100 exchanges the device ID and security protocol indication information of the communication apparatus 100 with another communication apparatus (hereinafter, it is regarded as communication apparatus 200) using near field communication. The device ID and security protocol indication information of the communication apparatus 100 are set in the field Gi[n] of the ATR_REQ (step S201). The process in step S201 may be executed by the controller 110.

When the device ID and security protocol indication information of the communication apparatus 100 are set in the field Gi[n] of the ATR_REQ, the communication apparatus 100 transmits the ATR_REQ in which information is set to the communication apparatus 200 using near field communication (step S202). The transmission process in step S202 may be executed by the RF communication section 130.

When the communication apparatus 100 transmits ATR_REQ in which information is set to the communication apparatus 200 using near field communication, the communication apparatus 100 receives ATR_RES that is a response to the ATR_REQ from the communication apparatus 200 using near field communication (step S203). The reception process in step S203 may be executed by the RF communication section 130. The device ID and security protocol indication information of the communication apparatus 200 are set in the field Gt[n] of the ATR_RES.

When the communication apparatus 100 receives ATR_RES that is a response to the ATR_REQ from the communication apparatus 200 using near field communication, the communication apparatus 100 determines whether any one of the device IDs stored in the storage section 111 is the same as the device ID of the communication apparatus 200 set in the ATR_RES (step S204). This determination process may be executed by the controller 110.

If it is determined in step S204 that any one of the device IDs stored in the storage section 111 is the same as the device ID of the communication apparatus 200 set in the ATR_RES, the communication apparatus 100 executes mutual authentication with the communication apparatus 200 (step S205). The communication apparatus 100 uses the shared secret information K1 corresponding to the device ID of the communication counterpart as a secret key when the mutual authentication with the communication apparatus 200 is executed. Then, the communication apparatus 100 executes the mutual authentication with the communication apparatus 200 according to the procedure specified in the security protocol S1 corresponding to the device ID of the communication counterpart. The process for performing the mutual authentication with the communication apparatus 200 may be executed by the LLCP link protocol processing section 132 or the NFC-SEC protocol processing section 134.

When the mutual authentication with the communication apparatus 200 is executed, the communication apparatus 100 determines whether the mutual authentication with the communication apparatus 200 is successful (step S206). The determination process in step S206 may be executed by the controller 110. If the communication apparatus 200 does not contain shared secret information K1, the mutual authentication between the communication apparatus 100 and the communication apparatus 200 is unsuccessful even if the communication apparatus 100 contains the shared secret information K1.

If it is determined in step S206 that the mutual authentication with the communication apparatus 200 is successful, the communication apparatus 100 executes the encrypted communication with the mutually authenticated communication apparatus 200.

If it is determined in step S204 that none of the device IDs stored in the storage section 111 is the same as the device ID of the communication apparatus 200 set in the ATR_RES, or if it is determined in step S206 that the mutual authentication with the communication apparatus 200 is unsuccessful, the communication apparatus 100 determines whether the shared secret information K1 is generated to perform the mutual authentication with the communication apparatus 200 (step S207). The determination process in step S207 may be executed by the controller 110. The determination of whether the shared secret information K1 is generated may be made depending on an application executed by the communication apparatus 100 or the user using the application.

If it is determined in step S207 that the shared secret information K1 is not generated, the communication apparatus 100 determines whether the unencrypted communication is performed with the communication apparatus 200 (step S208). The determination process in step S208 may be executed by the controller 110. The determination of whether the unencrypted communication is performed with the communication apparatus 200 may be made depending on an application executed by the communication apparatus 100 or the user using the application.

If it is determined in step S208 that the unencrypted communication is performed with the communication apparatus 200, the communication apparatus 100 executes the unencrypted communication with the communication apparatus 200 (no mutual authentication).

On the other hand, if it is determined in step S207 that the shared secret information K1 is generated, the communication apparatus 100 generates the shared secret information K1 through the SSE service of NFC-SEC (step S209). The generation of the shared secret information K1 in step S209 may be executed, for example, by the RF communication section 130, more specifically the NFC-SEC protocol processing section 134.

When the shared secret information K1 is generated through the SSE service of NFC-SEC, the communication apparatus 100 registers the shared secret information K1 generated in step S209 in association with the device ID of the communication apparatus 200 set in Gt[n] of ATR_RES received in step S203 (step S210). The registration process in step S210 may be executed, for example, by allowing the controller 110 to associate the shared secret information K1 with the device ID of the communication apparatus 200 and to store the shared secret information K1 to the storage section 111.

If it is determined in step S208 that the communication with the communication apparatus 200 is not performed in unencrypted form, or if the registration process in step S210 is completed, the communication apparatus 100 terminates the RF communication.

In this way, in the case where the communication apparatus 100 is instructed to execute the encrypted communication as a first operation, if the communication apparatus 100 and the communication counterpart have individual histories of previous communication between them using near field communication and contain the shared secret information K1 during the previous communication, the mutual authentication between them is successful. The communication apparatus 100 can execute the encrypted near field communication with a communication counterpart only if the mutual authentication is passed, and thus it is possible to execute more secure encrypted near field communication.

In the example shown in FIG. 23, prior to the start of the mutual authentication process in step S205, the communication apparatus 100 may ask the communication apparatus 200 serving as a communication counterpart device about whether the communication apparatus 200 contains the device ID of the communication apparatus 100. The communication apparatus 100 may perform such an inquiry using the PAX PDU.

Figure 24A:
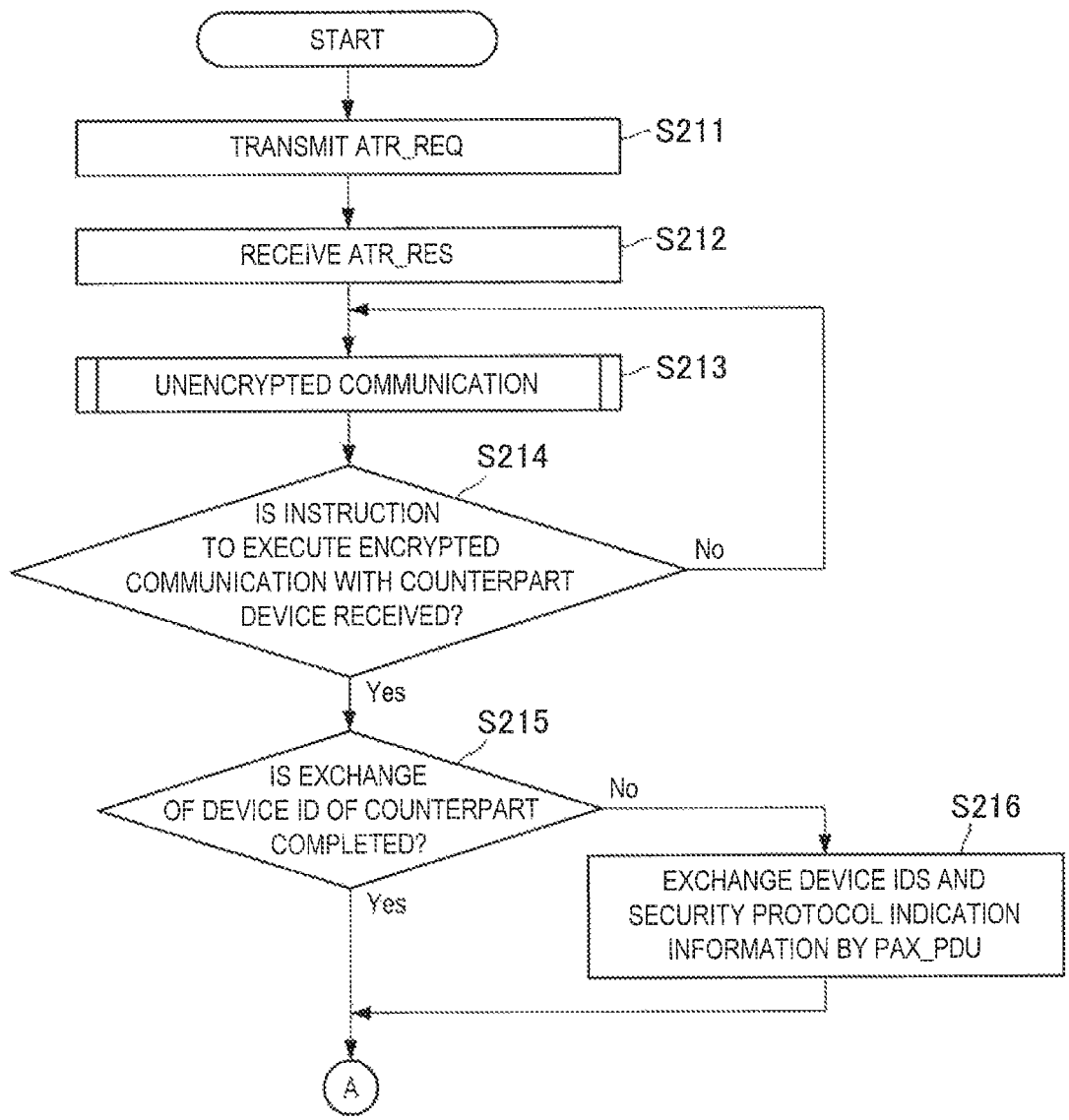
FIG. 24A is a flow chart which shows an operation example of the communication apparatus 100 according to an embodiment of the present disclosure.
Figure 24B:
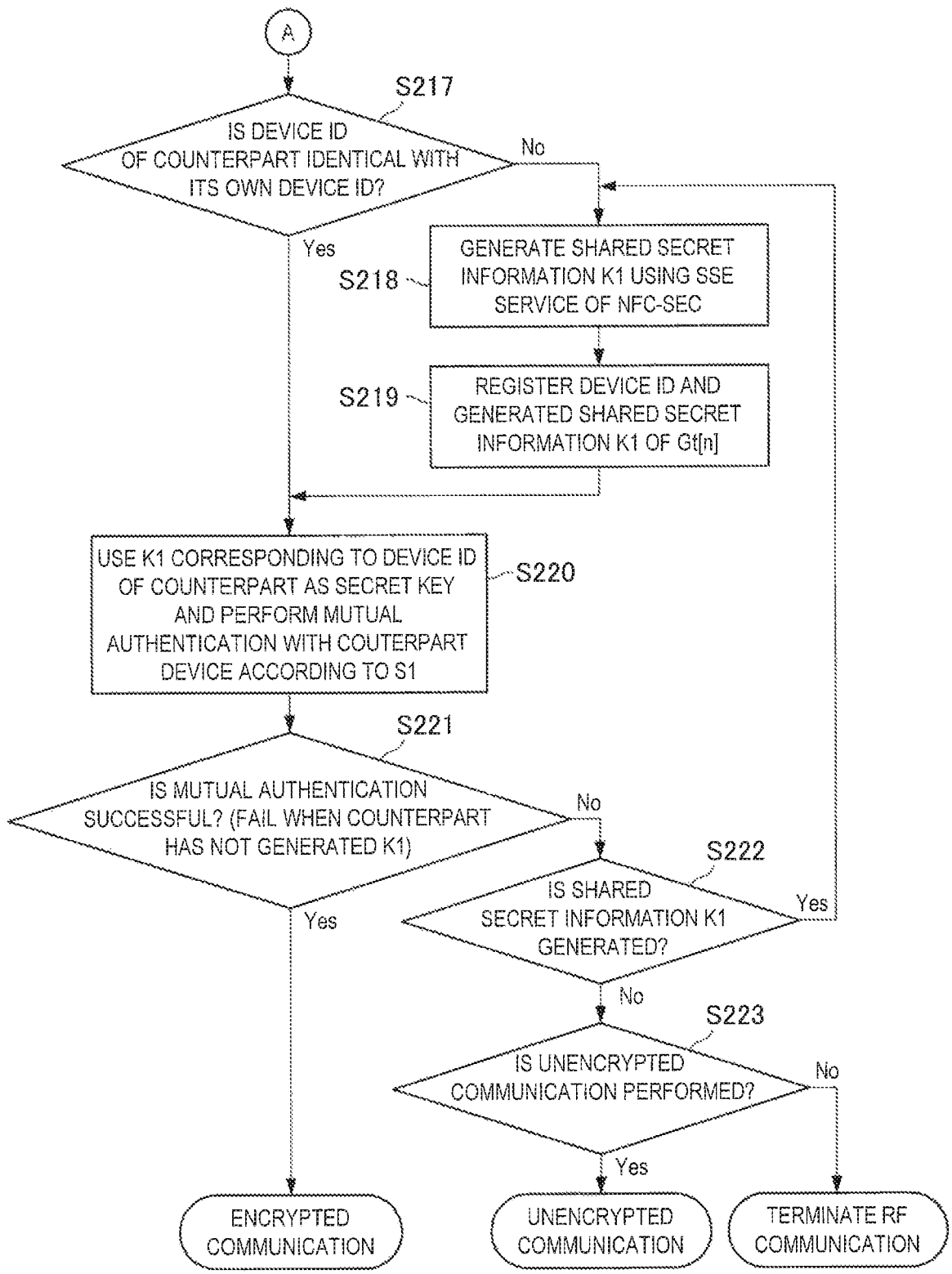
FIG. 24B is a flow chart which shows an operation example of the communication apparatus 100 according to an embodiment of the present disclosure.

FIGS. 24A and 24B are flowcharts illustrating an exemplary operation of the communication apparatus 100 according to an embodiment of the present disclosure. FIGS. 24A and 24B illustrate an exemplary operation of the communication apparatus 100 operating in Case 2. An exemplary operation of the communication apparatus 100 according to an embodiment of the present will be described with reference to FIGS. 24A and 24B.

When the communication apparatus 100 executes near field communication with another communication apparatus (hereinafter, it is regarded as communication apparatus 200), the communication apparatus 100 transmits ATR_REQ to the communication apparatus 200 using near field communication (step S211). The transmission process in step S202 may be executed by the RF communication section 130.

When the communication apparatus 100 transmits the ATR_REQ to the communication apparatus 200, the communication apparatus 100 receives ATR_RES that is a response to the ATR_REQ from the communication apparatus 200 using near field communication (step S212). The reception process in step S212 may be executed by the RF communication section 130.

Then, the communication apparatus 100 starts unencrypted near field communication with the communication apparatus 200 (step S213). The communication apparatus 100 determines whether an instruction to execute the encrypted communication with the communication apparatus 200 serving as a communication counterpart device is received from an application running in the apparatus, a user interface, or the like, while the communication apparatus 100 executes the unencrypted near field communication with the communication apparatus 200 (step S214). The determination process in step S214 may be executed, for example, by the controller 110.

If it is determined in step S214 that the communication apparatus 100 does not receive an instruction to perform the encrypted communication with the communication apparatus 200, the communication apparatus 100 continues to perform the unencrypted near field communication with the communication apparatus 100. On the other hand, if it is determined in step S214 that the communication apparatus 100 receives an instruction to perform the encrypted communication with the communication apparatus 200, the communication apparatus 100 determines whether the device ID is received from the communication apparatus 200 serving as a communication counterpart device (step S215). The determination process in step S214 may be executed by, for example, the controller 110.

If it is determined in step S215 that the device ID is not received from the communication apparatus 200, the communication apparatus 100 exchanges the device ID and security protocol indication information with the communication apparatus 200 using the LLC PAX PDU (step S216). The exchange process in step S216 may be executed by the RF communication section 130, more specifically the LLCP connection processing section 131.

When the device ID is received from the communication apparatus 200, the communication apparatus 100 determines whether any one of the device IDs stored in the storage section 11 is the same as the device ID of the communication apparatus 200 set in the ATR_RES (step S217). The determination process in step S217 may be executed by the controller 110.

If it is determined in step S217 that none of the device IDs stored in the storage section 111 is the same as the device ID of the communication apparatus 200 set in the ATR_RES, the communication apparatus 100 generates shared secret information K1 through the SSE service of NFC-SEC (step S218). The generation of the shared secret information K1 in step S218 may be executed, for example, by the RF communication section 130, more specifically the NFC-SEC protocol processing section 134.

When the shared secret information K1 is generated through the SSE service of NFC-SEC, the communication apparatus 100 registers the shared secret information K1 generated in step S218 in association with the device ID of the communication apparatus 200 set in Gt[n] of ATR_RES received in step S212 (step S219). The registration process in step S219 may be executed, for example, by allowing the controller 110 to associate the shared secret information K1 with the device ID of the communication apparatus 200 and to store the shared secret information K1 to the storage section 111.

If it is determined in step S217 that any of the device IDs stored in the storage section 111 is the same as the device ID of the communication apparatus 200 set in the ATR_RES, the communication apparatus 100 generates shared secret information K1 through the SSE service of NFC-SEC, or if the registration process in step S219 is completed, the communication apparatus 100 executes the mutual authentication with the communication apparatus 200 (step S220). The communication apparatus 100 uses the shared secret information K1 corresponding to the device ID of the communication counterpart as a secret key when the mutual authentication with the communication apparatus 200 is executed. Then, the communication apparatus 100 executes the mutual authentication with the communication apparatus 200 according to the procedure specified in the security protocol S1 corresponding to the device ID of the communication counterpart. The process for performing the mutual authentication with the communication apparatus 200 may be executed by the LLCP link protocol processing section 132 or the NFC-SEC protocol processing section 134.

When the mutual authentication with the communication apparatus 200 is executed, the communication apparatus 100 determines whether the mutual authentication with the communication apparatus 200 is successful (step S221). The determination process in step S221 may be executed by the controller 110. If the communication apparatus 200 does not contain shared secret information K1, the mutual authentication between the communication apparatus 100 and the communication apparatus 200 is unsuccessful even if the communication apparatus 100 contains the shared secret information K1.

If it is determined in step S221 that the mutual authentication with the communication apparatus 200 is successful, the communication apparatus 100 executes the encrypted communication with the mutually authenticated communication apparatus 200.

On the other hand, if it is determined in step S221 that the mutual authentication with the communication apparatus 200 is unsuccessful, the communication apparatus 100 determines whether shared secret information K1 for the mutual authentication with the communication apparatus 200 is generated (step S222). The determination process in step S222 may be executed by the controller 110. The determination of whether the shared secret information K1 is generated may be made depending on an application executed by the communication apparatus 100 or the user using the application.

If it is determined in step S222 that the shared secret information K1 is not generated, the communication apparatus 100 determines whether the communication with the communication apparatus 200 is performed in unencrypted form (step S223). The determination process in step S223 may be executed by the controller 110. The determination of whether the communication with the communication apparatus 200 is performed in unencrypted form may be made depending on an application executed by the communication apparatus 100 or the user using the application.

If it is determined in step S223 that the communication with the communication apparatus 200 is performed in unencrypted form, the communication apparatus 100 executes the unencrypted communication with the communication apparatus 200 (no mutual authentication). On the other hand, if it is determined in step S223 that the communication with the communication apparatus 200 is not performed in unencrypted form, the communication apparatus 100 terminates the RF communication.

If it is determined in step S222 that the shared secret information K1 is generated, the communication apparatus 100 executes the process of generating the shared secret information K1 in step S218.

In this way, even in the case where the communication apparatus 100 is instructed to execute the encrypted communication as the subsequent operation, if the communication apparatus 100 and the communication counterpart have individual histories of previous communication between them using near field communication and contain the shared secret information K1 during the previous communication, the mutual authentication between them is successful. Even in the case where the communication apparatus 100 is instructed to execute the encrypted communication as the subsequent operation, the communication apparatus 100 can execute the encrypted near field communication with a communication counterpart only if the mutual authentication is passed, and thus it is possible to execute more secure encrypted near field communication.

In the example shown in FIGS. 24A and 24B, prior to the start of the mutual authentication process in step S220, the communication apparatus 100 may ask the communication apparatus 200 serving as a communication counterpart device about whether the communication apparatus 200 contains the device ID of the communication apparatus 100. The communication apparatus 100 may perform such an inquiry using the PAX PDU.

In the flowcharts shown in FIGS. 23, 24A, and 24B, the determination of whether the mutual authentication is successful or not is made in step S206 or S220. Even when one device contains its own shared secret information K1, if a communication counterpart device does not contain shared secret information K1, the mutual authentication between them is unsuccessful. Thus, in the embodiment of the present disclosure, prior to the determination of whether the mutual authentication is successful or not in step S206 or S220, the communication apparatus 100 may ask the communication counterpart device about whether the communication counterpart device contains the shared secret information K1 corresponding to that of the communication apparatus 100. The communication apparatus may perform such an inquiry using the PAX PDU.

In this regard, the description will be given of a set of elements including device ID, shared secret information (secret key) K1, and security protocol number S1, which are stored in the storage section 111. In the following, a table storing the set of elements including device ID, shared secret information (secret key) K1, and security protocol number S1, which are stored in the storage section 111 is referred to as a device ID-secret key correlation table (ID-SK Table).

Table 5 below indicates an example of a device ID-secret key correlation table stored in the storage section 111. In a case where the communication apparatus tries to execute the encrypted communication with a communication counterpart device, if a device ID of the communication counterpart device included in the device ID-secret key correlation table, the communication apparatus 100 executes the mutual authentication by using shared secret information (secret key) corresponding to the device ID of the communication counterpart device or according to the security protocol corresponding to the device ID of the counterpart device. If the mutual authentication with the counterpart device is successful, the communication apparatus 100 operates to execute the mutual authentication with the counterpart device.

TABLE 5

Device ID-secret key correlation table

| Device ID | Secret key | Security protocol |
|-----------|------------|-------------------|
| ID-A      | K1         | S1                |
| ID-B      | K2         | S2                |

The exemplary operation of the communication apparatus 100 according to an embodiment of the present disclosure has been described in more detail. An operation of the communication apparatus 100 according to an embodiment of the present disclosure will be described using a detailed process sequence. The description will be given of an example a process sequence for each security protocol number (number set in Value field) of the security protocol indication information shown in FIG. 13.

Figure 25:
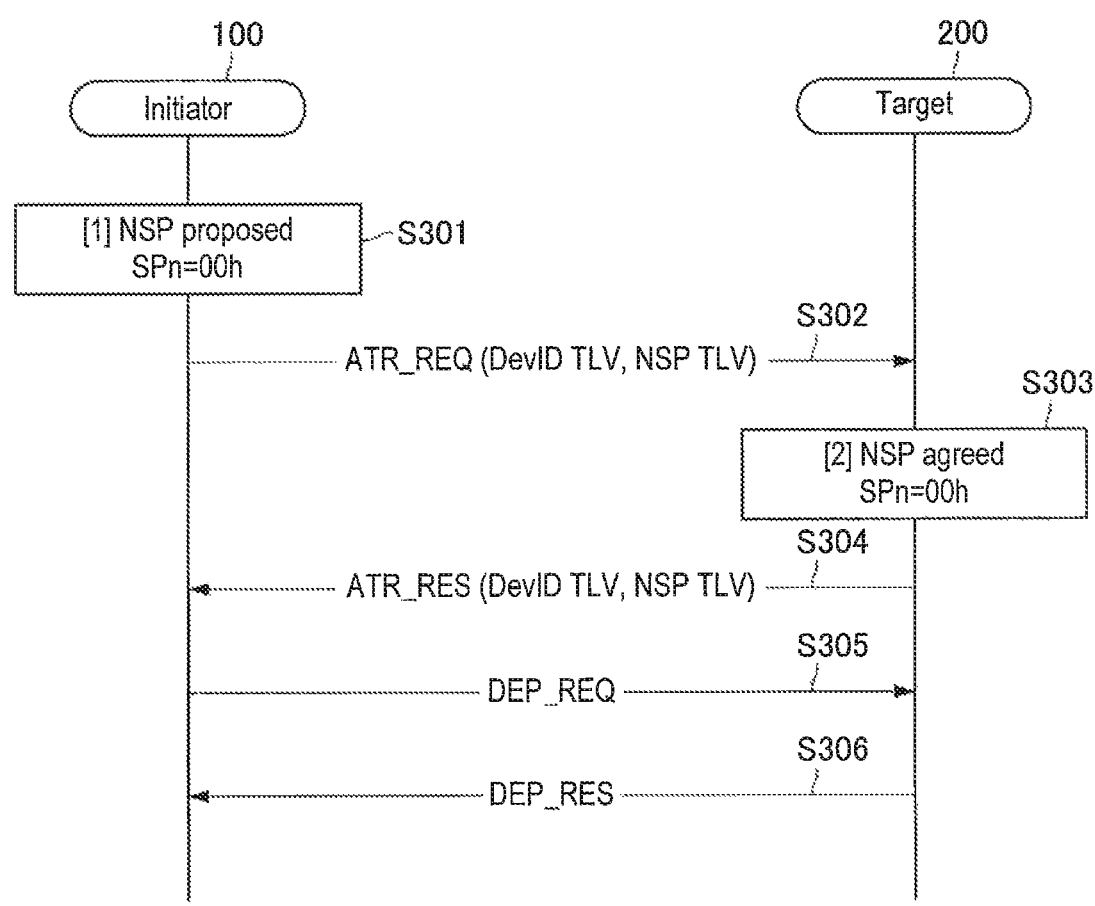
FIG. 25 is a flow chart showing a process sequence between the communication apparatuses 100 and 200.

A process sequence in a case where the security protocol number is 00h, that is, a case where the near field communication is performed in unencrypted form will be described. FIG. 25 is a flow chart showing a process sequence between the communication apparatuses 100 and 200. The flow chart shown in FIG. 25 is a process sequence in a case where the security protocol number is 00h, that is, a case where the near field communication is performed in unencrypted form. The process sequence of FIG. 25 illustrates a case where the communication apparatus 100 is an initiator and the communication apparatus 200 is a target.

The communication apparatus 100 serving as an initiator decides to execute the near field communication without encryption, that is, the security protocol number is 00h (step S301). The decision process in step S301 may be executed, for example, by the controller 110. The execution of the near field communication without encryption may be determined by an application executed by the communication apparatus 100 or the user using the application.

When the decision to execute the near field communication without encryption is made, the communication apparatus 100 sets ATR_REQ with its own device ID and the security protocol indication information in which 00h is assigned to the security protocol number and transmits it to the communication apparatus 200 serving as a target using the near field communication (step S302). In FIG. 25 and the subsequent figures, TLV in which a device's own ID is set is denoted as DevID TLV, and TLV in which the security protocol indication information is set is denoted as NSP TLV.

When the communication apparatus 200 receives the ATR_REQ from the communication apparatus 100, the communication apparatus 200 checks the assigned security protocol number in the security protocol indication information and agrees to execute the near field communication without encryption (step S303). The communication apparatus 200 that agrees to execute the near field communication without encryption sets ATR_RES with its own device ID and the security protocol indication information in which 00h is assigned to the security protocol number and transmits it to the communication apparatus 100 serving as the initiator using the near field communication (step S304).

If the communication apparatus 100 agrees with the communication apparatus 200 to execute the near field communication without encryption, the communication apparatus 100 sets DEP_REQ with data to be transmitted and transmits it (step S305). The communication apparatus 200 receives the DEP_REQ, sets DEP_RES with data to be transmitted, and transmits it to the communication apparatus 100 (step S306).

Figure 26:
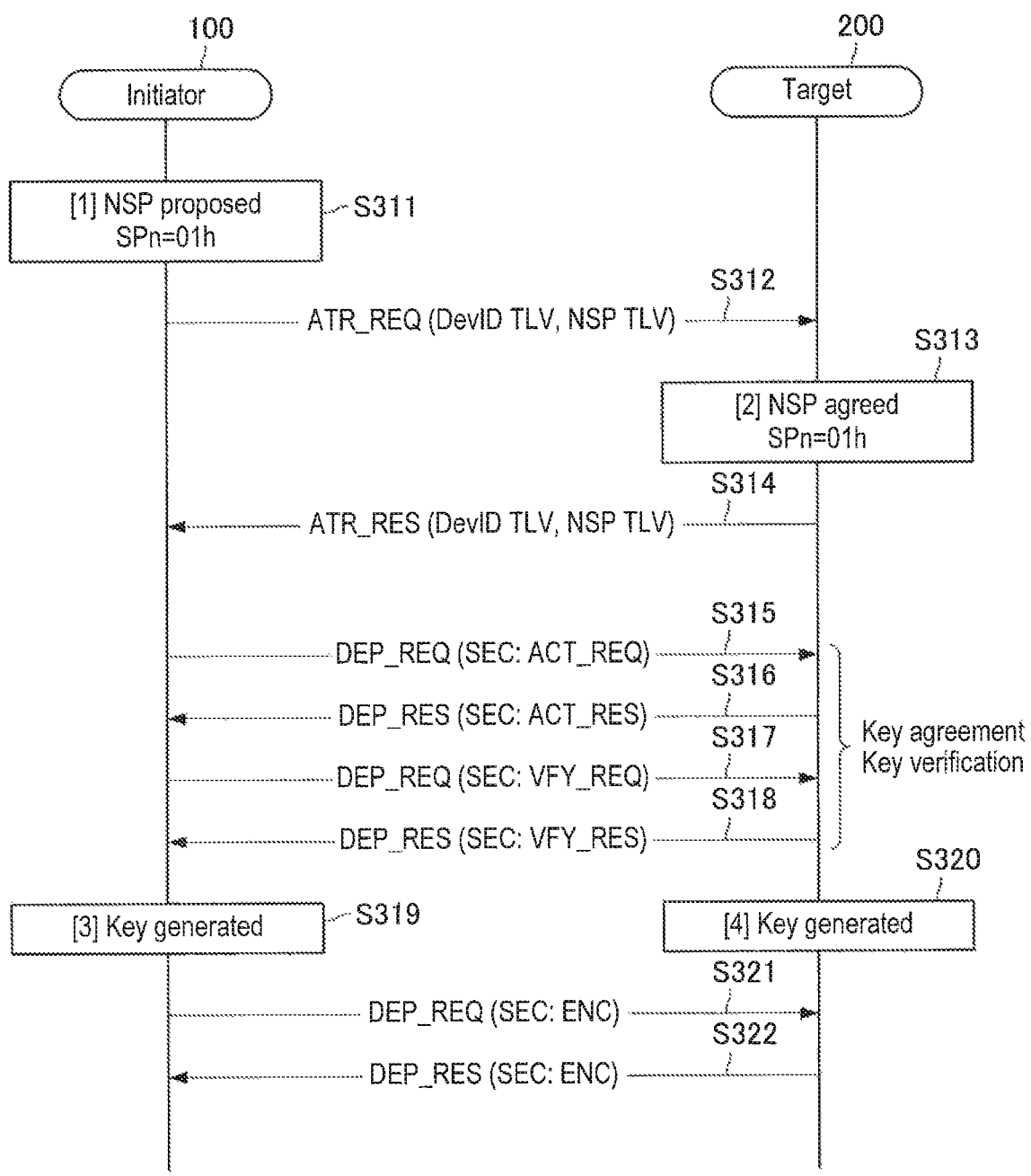
FIG. 26 is a flow chart showing a process sequence between the communication apparatuses 100 and 200.

Then, a process sequence in a case where the security protocol number is 01h, that is, a case where NFC-SEC SDU is encrypted using NFC-SEC SCH will be described. FIG. 26 is a flow chart showing a process sequence between the communication apparatuses 100 and 200. The flow chart shown in FIG. 26 is a process sequence in a case where the security protocol number is 01h, that is, a case where NFC-SEC SDU is encrypted using NFC-SEC SCH. The process sequence of FIG. 26 illustrates a case where the communication apparatus 100 is an initiator and the communication apparatus 200 is a target. When the security protocol number is 01h, only the Case 1 is applicable but the Case 2 is not applicable.

The communication apparatus 100 serving as an initiator decides to encrypt the NFC-SEC SDU using the NFC-SEC SCH, that is, the security protocol number is 01h (step S311). The decision process in step S311 may be executed, for example, by the controller 110. The execution of the near field communication without encryption may be determined by an application executed by the communication apparatus 100 or the user using the application.

When the decision to encrypt the NFC-SEC SDU using the NFC-SEC SCH is made, the communication apparatus 100 sets ATR_REQ with its own device ID and the security protocol indication information in which 01h is assigned to the security protocol number and transmits it to the communication apparatus 200 serving as a target using the near field communication (step S312).

When the communication apparatus 200 receives the ATR_REQ from the communication apparatus 100, the communication apparatus 200 checks the assigned security protocol number in the security protocol indication information and agrees to encrypt the NFC-SEC SDU using the NFC-SEC SCH (step S313). The communication apparatus 200 that agrees to encrypt the NFC-SEC SDU using the NFC-SEC SCH sets ATR_RES with its own device ID and the security protocol indication information in which 01h is assigned to the security protocol number and transmits it to the communication apparatus 100 serving as the initiator using the near field communication (step S314).

If the communication apparatus 100 agrees with the communication apparatus 200 to encrypt the NFC-SEC SDU using the NFC-SEC SCH, the communication apparatuses 100 and 200 execute a process of generating the shared secret information by using ACT_REQ, ACT_RES, VFY_REQ, and VFY_RES of ISO/IEC 13157-1 (steps S315 to S318). When the process of generating the shared secret information is executed in the communication apparatuses 100 and 200, DEP_REQ and DEP_RES may be used. The process of generating the shared secret information is performed in a key agreement phase and a key verification phase.

Both the communication apparatuses 100 and 200 execute the process of generating the shared secret information and thus each of the communication apparatuses 100 and 200 generates shared secret information and store it therein (steps S319 and S320). The communication apparatuses 100 and 200 having the generated shared secret information execute an ENC command of NFC-SEC to execute the near field communication in which the NFC-SEC SDU is encrypted (step S321 and S322). When the near field communication in which the NFC-SEC SDU is encrypted is performed, DEP_REQ and DEP_RES may be used.

Figure 27:
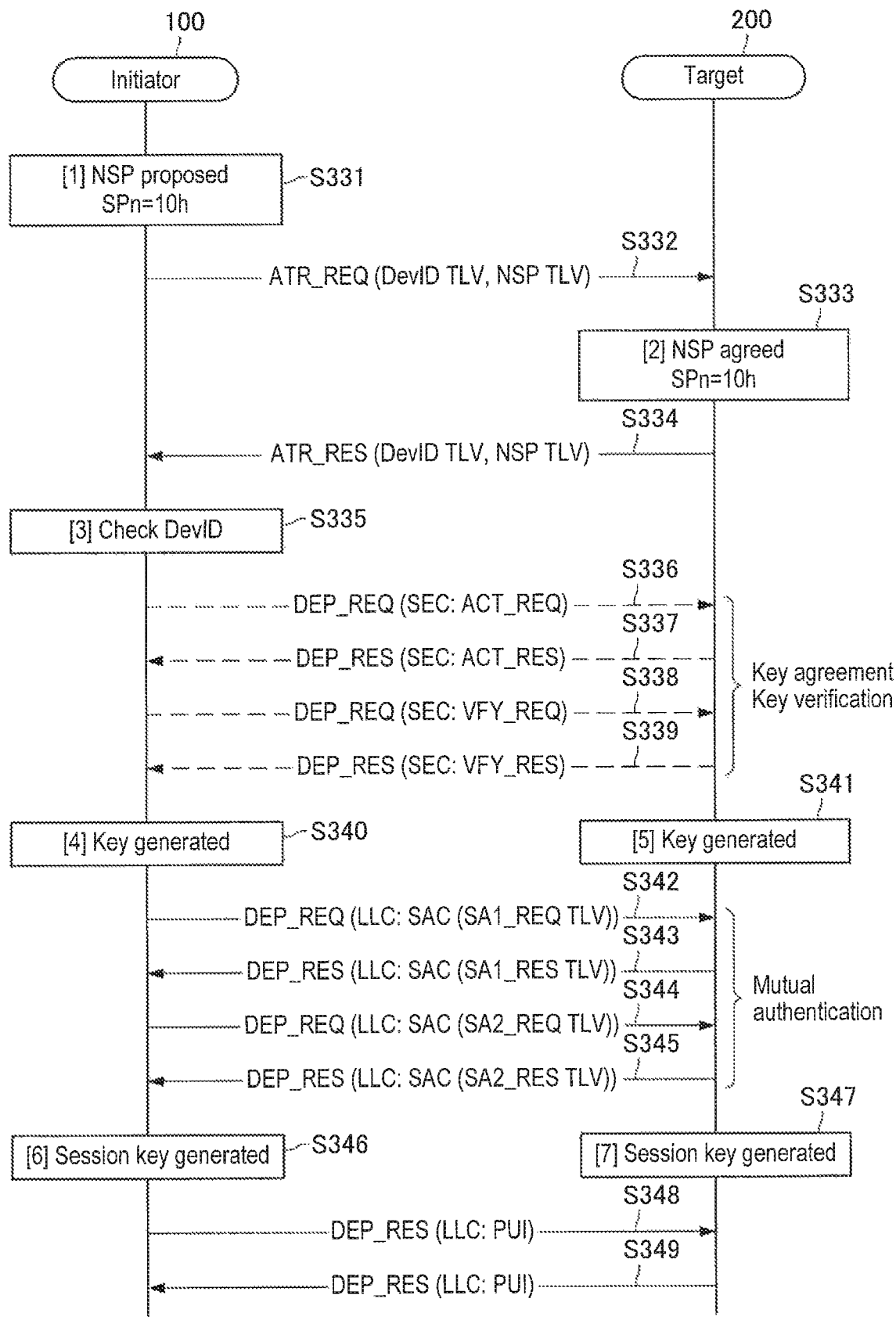
FIG. 27 is a flow chart showing a process sequence between the communication apparatuses 100 and 200.

Then, a process sequence in a case where the security protocol number is 10h, that is, a case where LLC SDU is encrypted will be described. FIG. 27 is a flow chart showing a process sequence between the communication apparatuses 100 and 200. The flow chart shown in FIG. 27 is a process sequence in a case where the security protocol number is 10h, that is, a case where LLC SDU is encrypted. The process sequence of FIG. 27 illustrates a case where the communication apparatus 100 is an initiator and the communication apparatus 200 is a target. When the security protocol number is 10h, any of Case 1 and Case 2 is applicable. FIG. 27 is a process sequence of a case where Case 1 is applied.

The communication apparatus 100 serving as an initiator decides to encrypt the LLC SDU, that is, the security protocol number is 10h (step S331). The decision process in step S331 may be executed, for example, by the controller 110. The execution of the near field communication without encryption may be determined by an application executed by the communication apparatus 100 or the user using the application.

When the decision to encrypt the LLC SDU is made, the communication apparatus 100 sets ATR_REQ with its own device ID and the security protocol indication information in which 10h is assigned to the security protocol number and transmits it to the communication apparatus 200 serving as a target using the near field communication (step S332).

When the communication apparatus 200 receives the ATR_REQ from the communication apparatus 100, the communication apparatus 200 checks the assigned security protocol number in the security protocol indication information and agrees to encrypt the LLC SDU (step S333). The communication apparatus 200 that agrees to encrypt the LLC SDU sets ATR_RES with its own device ID and the security protocol indication information in which 10h is assigned to the security protocol number and transmits it to the communication apparatus 100 serving as the initiator using the near field communication (step S334).

If the communication apparatus 100 agrees with the communication apparatus 200 to encrypt the LLC SDU, the communication apparatus 100 checks whether any one of the device IDs stored in the communication apparatus 100 is the same as the device ID of the communication apparatus 200 included in the received ATR_RES (step S335).

If it is determined in step S335 that there is no identical device ID, the communication apparatus 100 starts the process of generating the shared secret information. The communication apparatuses 100 and 200 execute the process of generating the shared secret information by using ACT_REQ, ACT_RES, VFY_REQ, and VFY_RES of ISO/IEC 13157-1 (steps S336 to S339). When the process of generating the shared secret information is executed in the communication apparatuses 100 and 200, DEP_REQ and DEP_RES may be used. The process of generating the shared secret information is performed in a key agreement phase and a key verification phase.

Both the communication apparatuses 100 and 200 execute the process of generating the shared secret information and thus each of the communication apparatuses 100 and 200 generates shared secret information and store it therein (steps S340 and S341). The communication apparatuses 100 and 200 having the generated shared secret information execute a mutual authentication process using the LLC SAC PDU (steps S342 to S345). When the mutual authentication process using the LLC SAC PDU is performed, the SA1_REQ TLV, SA1_RES TLV, SA2_REQ TLV, and SA2_RES TLV are used.

When the mutual authentication is completed by the mutual authentication process using LLC SAC PDU, each of the communication apparatuses 100 and 200 generates a session key and stores it therein (steps S346 and S347). When the session key is generated, each of the communication apparatuses 100 and 200 executes the encrypted communication using the session key by the LLC SAC PDU (steps S348 and S349).

In the process sequence shown in FIG. 27, if it is determined in step S335 that there is an identical device ID, the communication apparatus 100 may proceed directly to the mutual authentication process while skipping the process of generating the shared secret information in steps S336 to S339.

Figure 28:
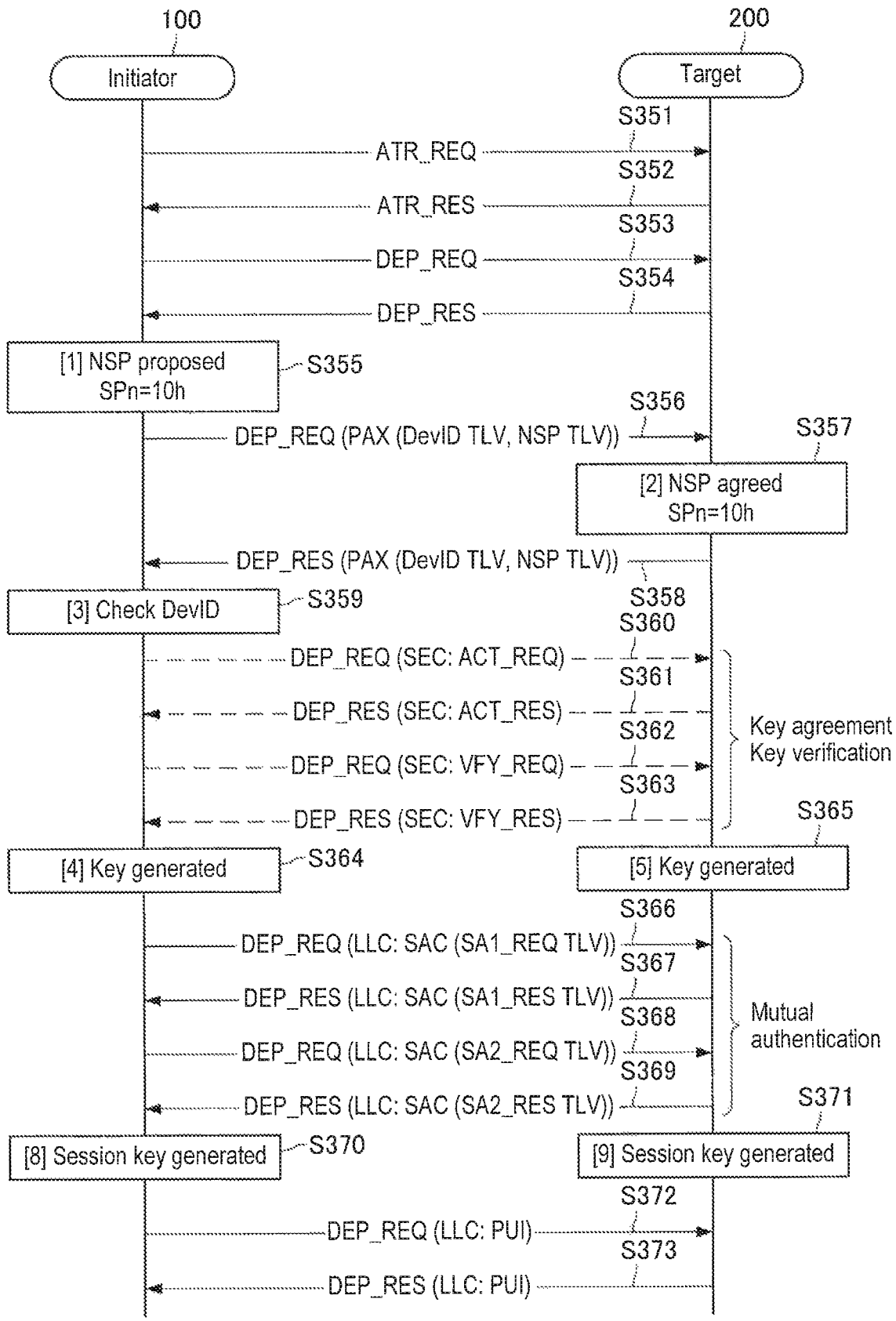
FIG. 28 is a flow chart showing a process sequence between the communication apparatuses 100 and 200.

FIG. 28 is a flow chart showing a process sequence between the communication apparatuses 100 and 200. The flow chart shown in FIG. 27 is a process sequence in a case where the security protocol number is 10h, that is, a case where LLC SDU is encrypted, which is similar to FIG. 27. The process sequence of FIG. 28 illustrates a case where the communication apparatus 100 is an initiator and the communication apparatus 200 is a target. FIG. 28 is a process sequence of a case where Case 2 is applied.

The communication apparatus 100 serving as an initiator is started by transmitting ATR_REQ to the communication apparatus 200 serving as a target (step S351). The communication apparatus 200, when receiving the ATR_REQ, responds to the communication apparatus 100 by a reply of ATR_RES (step S352). The communication apparatus 100, when receiving the ATR_RES, transmits DEP_REQ to transmit information to the communication apparatus 200 (step S353). The communication apparatus 200, when receiving the DEP_REQ, responds to the communication apparatus 100 by a reply of DEP_RES (step S354). The DEP_REQ and DEP_RES in steps S353 and S354, respectively, are transmitted without encryption.

When the communication is performed without encryption as described above, if it is necessary to perform an encrypted communication afterward, the communication apparatus 100 decides to encrypt the LLC SDU, that is, the security protocol number is 10h (step S355). The decision process in step S335 may be executed, for example, by the controller 110. The execution of the near field communication without encryption may be determined by an application executed by the communication apparatus 100 or the user using the application.

When the decision to encrypt the LLC SDU is made, the communication apparatus 100 sets DEP_REQ with its own device ID and the security protocol indication information in which 10h is assigned to the security protocol number and transmits it to the communication apparatus 200 serving as a target using PAX PDU through the near field communication (step S356).

The communication apparatus 200, when receiving the DEP_REQ from the communication apparatus 100, checks the assigned security protocol number in the security protocol indication information and agrees to encrypt the LLC SDU (step S357). The communication apparatus 200 that agrees to encrypt the LLC SDU sets DEP_RES with its own device ID and the security protocol indication information in which 10h is assigned to the security protocol number and transmits it to the communication apparatus 100 serving as the initiator using the near field communication (step S358).

If the communication apparatus 100 agrees with the communication apparatus 200 to encrypt the LLC SDU, the subsequent process is the same as the process sequence shown in FIG. 27. The communication apparatus 100 checks whether any one of the device IDs stored in the communication apparatus 100 is the same as the device ID of the communication apparatus 200 included in the received DEP_RES (step S359).

If it is determined in step S358 that there is no identical device ID, the communication apparatus 100 starts the process of generating the shared secret information. The communication apparatuses 100 and 200 execute the process of generating the shared secret information (steps S360 to S363) by using ACT_REQ, ACT_RES, VFY_REQ, and VFY_RES of NFC-SEC (ISO/IEC 13157-1). When the process of generating the shared secret information is executed in the communication apparatuses 100 and 200, DEP_REQ and DEP_RES may be used. The process of generating the shared secret information is performed in a key agreement phase and a key verification phase.

Both the communication apparatuses 100 and 200 execute the process of generating the shared secret information and thus each of the communication apparatuses 100 and 200 generates shared secret information and store it therein (steps S364 and S365). The communication apparatuses 100 and 200, which contain the generated shared secret information, execute a mutual authentication process using the LLC SAC PDU (steps S366 to S369). When the mutual authentication process using the LLC SAC PDU is performed, the SA1_REQ TLV, SA1_RES TLV, SA2_REQ TLV, and SA2_RES TLV are used.

When the mutual authentication is completed by the mutual authentication process using LLC SAC PDU, each of the communication apparatuses 100 and 200 generates a session key and stores it therein (steps S370 and S371). When the session key is generated, each of the communication apparatuses 100 and 200 executes the encrypted communication using the session key by the LLC SAC PDU (steps S372 and S373).

In the process sequence shown in FIG. 28, if it is determined in step S358 that there is an identical device ID, the communication apparatus 100 may proceed directly to the mutual authentication process while skipping the process of generating the shared secret information in steps S359 to S629.

In this way, in Case 2, although the communication apparatuses 100 and 200 exchange their own device IDs and the security protocol indication information using the PAX PDU, its own security protocol capability information may be provided to the communication counterpart to prompt the communication counterpart to select a protocol to be used from security protocol capability information. When the communication counterpart is allowed to select a protocol to be used, the security protocol capability information may be included in a parameter of the PAX PDU, for example, in the format described in FIG. 14. When the security protocol capability information is received, it is possible to indicate a security protocol to be used by the recipient through the security protocol indication information. If the communication apparatus 200 agrees with the indication information presented by the communication apparatus 100, the communication apparatus 200 responds to the communication apparatus 100 by the same indication information.

In the process sequence shown in FIG. 28, although the communication apparatuses 100 and 200 execute the process of generating the shared secret information (steps S360 to S363) by using ACT_REQ, ACT_RES, VFY_REQ, and VFY_RES of NFC-SEC (ISO/IEC 13157-1), the LLC PDU may be used instead of the NFC-SEC.

Figure 29:
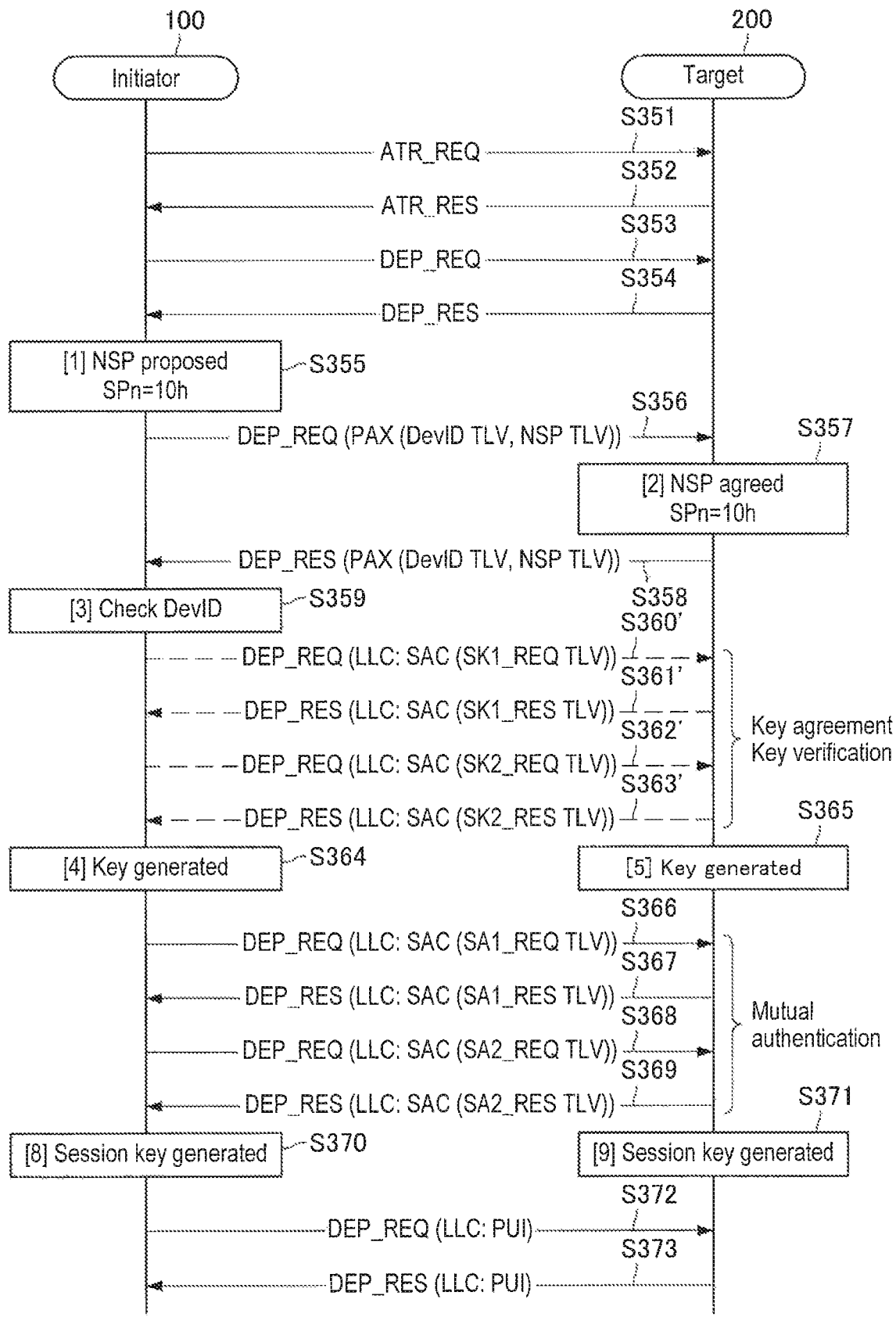
FIG. 29 is a flow chart showing a process sequence between the communication apparatuses 100 and 200.

FIG. 29 is a flow chart showing a process sequence between the communication apparatuses 100 and 200. The flow chart shown in FIG. 27 is a process sequence in a case where the security protocol number is 10h, that is, a case where LLC SDU is encrypted, which is similar to FIG. 28. The process sequence of FIG. 29 illustrates a case where the communication apparatus 100 is an initiator and the communication apparatus 200 is a target. FIG. 29 illustrates a process sequence in a case where the process of generating the shared secret information is executed using the LLC PDU instead of the NFC-SEC.

In the process sequence shown in FIG. 29, If it is determined in step S358 that there is no identical device ID, the communication apparatuses 100 and 200 execute the process of generating the shared secret information by using SK1_REQ TLV, SK1_RES TLV, SK2_REQ TLV, and SK2 RES TLV of the LLC SAC PDU (steps S360' to S363'). In this way, the communication apparatuses 100 and 200 use the LLC PDU instead of the NFC-SEC, thus it is possible to execute the process of generating the shared secret information.

Figure 30:
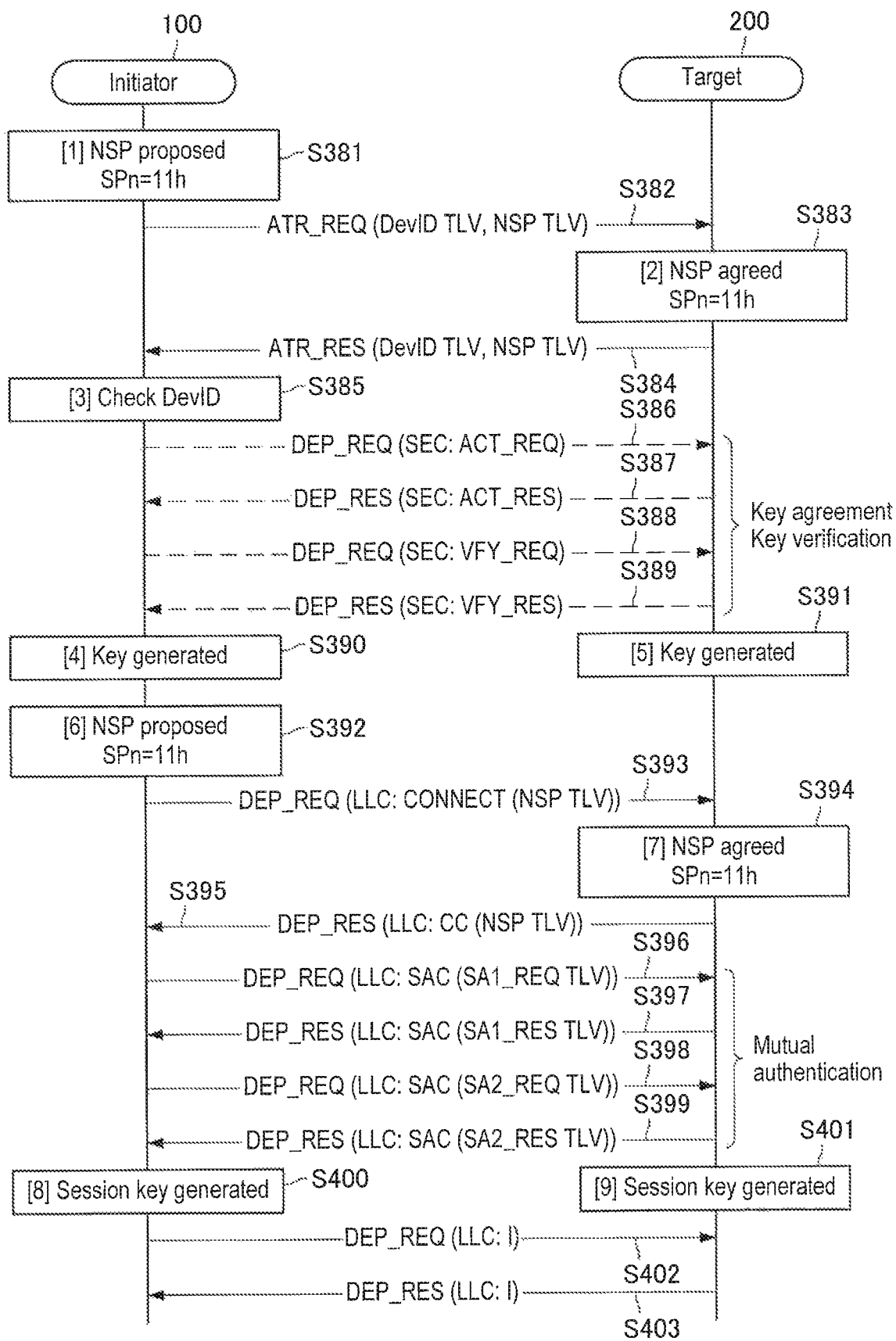
FIG. 30 is a flow chart showing a process sequence between the communication apparatuses 100 and 200.

A process sequence in a case where the security protocol number is 11h, that is, a case where the LLC I SDU is encrypted will be described. FIG. 30 is a flow chart showing a process sequence between the communication apparatuses 100 and 200. The flow chart shown in FIG. 30 is a process sequence in a case where the security protocol number is 11 h, that is, a case where the LLC I SDU is encrypted. The process sequence of FIG. 25 illustrates a case where the communication apparatus 100 is an initiator and the communication apparatus 200 is a target. When the security protocol number is 11h, only the Case 1 is applicable.

The communication apparatus 100 serving as an initiator decides to encrypt the LLC I SDU, that is, the security protocol number is 11h (step S381). The decision process in step S381 may be executed, for example, by the controller 110. The execution of the near field communication without encryption may be determined by an application executed by the communication apparatus 100 or the user using the application.

When the decision to encrypt the LLC I SDU is made, the communication apparatus 100 sets ATR_REQ with its own device ID and the security protocol indication information in which 11h is assigned to the security protocol number and transmits it to the communication apparatus 200 serving as a target using the near field communication (step S382).

The communication apparatus 200, when receiving the ATR_REQ from the communication apparatus 100, checks the assigned security protocol number in the security protocol indication information and agrees to encrypt the LLC I SDU (step S383). The communication apparatus 200 that agrees to encrypt the LLC I SDU sets ATR_RES with its own device ID and the security protocol indication information in which 11h is assigned to the security protocol number and transmits it to the communication apparatus 100 serving as the initiator using the near field communication (step S384).

If the communication apparatus 100 agrees with the communication apparatus 200 to encrypt the LLC I SDU, the communication apparatus 100 checks whether any one of the device IDs stored in the communication apparatus 100 is the same as the device ID of the communication apparatus 200 included in the received ATR_RES (step S385).

If it is determined in step S385 that there is no identical device ID, the communication apparatus 100 starts the process of generating the shared secret information. The communication apparatuses 100 and 200 execute the process of generating the shared secret information by using ACT_REQ, ACT_RES, VFY_REQ, and VFY_RES of ISO/IEC 13157-1 (steps S386 to S389). When the process of generating the shared secret information is executed in the communication apparatuses 100 and 200, DEP_REQ and DEP_RES may be used. The process of generating the shared secret information is performed in a key agreement phase and a key verification phase.

Both the communication apparatuses 100 and 200 execute the process of generating the shared secret information and thus each of the communication apparatuses 100 and 200 generates shared secret information and store it therein (steps S389 and S390). The communication apparatuses 100 and 200 having the generated shared secret information execute a mutual authentication process using the shared secret information. When only the PDU of a particular connection in the transport layer is encrypted, the communication apparatuses 100 and 200 exchange the CONNECT PDU and CC PDU including the security protocol indication information in which 11h is assigned to the security protocol number (steps S391 to S394).

The communication apparatuses 100 and 200, when generating the shared secret information and exchanging the CONNECT PDU and CC PDU with each other, execute the mutual authentication process using the LLC SAC PDU (steps S395 to S398). When the mutual authentication process using the LLC SAC PDU is executed, the above-mentioned SA1_REQ TLV, SA1_RES TLV, SA2_REQ TLV, and SA2 RES TLV are used.

When the mutual authentication is completed by the mutual authentication process using LLC SAC PDU, each of the communication apparatuses 100 and 200 generates a session key and stores it therein (steps S399 and S400). When the session key is generated, each of the communication apparatuses 100 and 200 executes the encrypted communication using the session key by the LLC PUI PDU (steps S401 and S402).

In the process sequence shown in FIG. 30, if it is determined in step S385 that there is an identical device ID, the communication apparatus 100 may skip the process of generating the shared secret information in steps S386 to S389.

The process sequence between the communication apparatuses 100 and 200 has been described in detail. The communication apparatuses 100 and 200 according to an embodiment of the present disclosure operate based on the above-mentioned process sequence. The communication apparatus 100 can execute the encrypted near field communication with a communication counterpart only if the mutual authentication is passed, and thus it is possible to execute more secure encrypted near field communication.

2. CONCLUSION

According to the embodiments of the present disclosure as described above, there is provided a communication apparatus and communication method, capable of executing the encrypted near field communication with a communication counterpart after the passage of mutual authentication. The communication apparatus 100 according to an embodiment of the present disclosure, when executing the encrypted near field communication with the communication apparatus 200, generates the shared secret information using the NFC-SEC technology and allows the generated shared secret information and the device ID of the communication apparatus 200 to be retained inside the communication apparatus 100.

When the communication apparatus 100 tries to execute the near field communication with the communication apparatus 200 at a subsequent time, the communication apparatus 100 can verify, by the mutual authentication process, that a communication counterpart is the communication counterpart having a device ID that is identical to that generated in the previous near field communication. When it can be verified, by the mutual authentication process, that a communication counterpart is the communication counterpart having a device ID that is identical to that generated in the previous near field communication, the communication apparatus 100 executes the encrypted communication with the communication apparatus 200.

In this way, when it is verified that a communication counterpart is the communication counterpart having a device ID that is identical to that generated in the previous near field communication, the communication apparatus 100 according to an embodiment of the present disclosure executes the encrypted communication with the communication apparatus 200. Thus, the communication apparatus 100 can prevent the encrypted communication for exchanging secret information with unintended counterpart from being performed. Accordingly, the communication apparatus 100 according to an embodiment of the present disclosure can execute more secure encrypted communication during the near field communication.

It is not necessary for each step in the processes executed by each apparatus according to embodiments of the present disclosure to be performed in chronological sequence, in accordance with the order described in the sequences or flow charts. For example, each step in the processes executed by each apparatus may be performed in parallel, even if the processes are performed in a different order from the order described as the flow charts.

Further, a computer program for causing hardware, such as a CPU, ROM and RAM built-into each apparatus, to exhibit functions similar to the configurations of each of the above described apparatuses can be created. Further, a storage medium storing this computer program can also be provided. Further, a series of processes can be executed with the hardware, by configuring each of the functional blocks shown by the functional block figures with hardware.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Additionally, the present technology may also be configured as below.

(1)

An integrated circuit including:

a communication processing section configured to communicate with another apparatus through non-contact communication; and an encryption information generation section configured to make a determination on generation of authentication information used to mutually authenticate the other apparatus in performing non-contact communication with the other apparatus depending on presence or absence of a history of non-contact communication with the other apparatus, before the communication processing section executes communication of encrypted information with the other apparatus.

(2)

The integrated circuit according to (1), wherein in absence of a history of non-contact communication with the other apparatus, the encryption information generation section generates authentication information used to mutually authenticate the other apparatus in performing non-contact communication with the other apparatus.

(3)

The integrated circuit according to (2), wherein the communication processing section receives identification information from the other apparatus and stores the identification information in association with the authentication information generated by the encryption information generation section, the identification information being used to identify the other apparatus.

(4)

The integrated circuit according to any of (1) to (3), wherein the communication processing section executes authentication of the other apparatus using the authentication information generated based on the presence of a history of non-contact communication with the other apparatus.

(5)

The integrated circuit according to (4), wherein the communication processing section executes authentication of the other apparatus using a protocol selected from available protocols exchanged with the other apparatus prior to execution of authentication of the other apparatus.

(6)

The integrated circuit according to (4) or (5), wherein the encryption information generation section generates an encryption key used for encrypted non-contact communication with the other apparatus authenticated by the communication processing section.

(7)

The integrated circuit according to (6), wherein the communication processing section further includes an encryption unit configured to encrypt information transmitted through non-contact communication with the other apparatus using the encryption key generated by the encryption information generation section.

(8)

The integrated circuit according to (7), wherein the encryption unit decides a range of information to be encrypted based on a parameter exchanged with the other apparatus prior to the encryption of information transmitted through non-contact communication with the other apparatus.

(9)

The integrated circuit according to any of (1) to (8), wherein the encryption information generation section, when encrypted communication with the other apparatus is not specified in advance to be performed prior to start of non-contact communication with the other apparatus, makes a determination on generation of authentication information used to mutually authenticate the other apparatus in performing non-contact communication with the other apparatus depending on presence or absence of a history of non-contact communication with the other apparatus after encrypted communication with the other apparatus is specified to be performed.

(10)

The integrated circuit according to any of (1) to (9), wherein non-contact communication performed by the communication processing section is communication that can be executed concurrently with establishing a plurality of connections.

(11)

A communication method including the steps of:

communicating with another apparatus through non-contact communication; and making a determination on generation of authentication information used to mutually authenticate the other apparatus in performing non-contact communication with the other apparatus depending on presence or absence of a history of non-contact communication with the other apparatus, prior to execution of communication of encrypted information with the other apparatus.

(12)

A computer program for causing a computer to execute the steps of:

communicating with another apparatus through non-contact communication; and making a determination on generation of authentication information used to mutually authenticate the other apparatus in performing non-contact communication with the other apparatus depending on presence or absence of a history of non-contact communication with the other apparatus, prior to execution of communication of encrypted information with the other apparatus.

(13)

A communication apparatus including:

an integrated circuit including a communication processing section configured to communicate with another apparatus through non-contact communication, and an encryption information generation section configured to make a determination on generation of authentication information used to mutually authenticate the other apparatus in performing non-contact communication with the other apparatus depending on presence or absence of a history of non-contact communication with the other apparatus, before the communication processing section executes communication of encrypted information with the other apparatus; and a power supply configured to supply the integrated circuit with power.

REFERENCE SIGNS LIST

100, 200 communication apparatus
110 controller
111 storage section
120 application execution section
130 RF communication section
131 LLCP connection processing section
132 LLCP link protocol processing section
133 encryption processing section
134 NFC-SEC protocol processing section
135 NFCIP-1 protocol processing section

The invention claimed is:

1. An integrated circuit comprising:

circuitry configured to initiate authentication for communication with another apparatus through non-contact communication when the another apparatus is placed in proximity to the integrated circuit, exchange identification information of the integrated circuit with identification information of the another apparatus, compare the exchanged identification information of the another apparatus with the identification information of the integrated circuit to obtain an individual result of the comparison, exchange the individual result of the comparison with another individual result, from the another apparatus, of another comparison of the exchanged identification information of the integrated circuit with the identification information of the another apparatus, determine, when the individual results are exchanged, whether or not the identification information of the another apparatus matches the identification information of the integrated circuit, based on the individual result the another individual result, generate authentication information used to mutually authenticate the another apparatus, based on a result of the determination that the identification information of the another apparatus does not match the identification information of the integrated circuit, the generation of the authentication information used to mutually authenticate the another apparatus being independent of an external input, and perform an encrypted Radio Frequency (RF) communication with the another apparatus after the generation of the authentication information.

2. The integrated circuit according to claim 1,
wherein when the result of the determination indicates absence of the exchanged identification information of the another apparatus in a history of non-contact communication, the circuitry is further configured to
generate the authentication information used to mutually authenticate the another apparatus in performing the non-contact communication with the another apparatus.

3. The integrated circuit according to claim 2,
wherein the circuitry is further configured to
initiate storage of the exchanged identification information of the another apparatus in association with the authentication information, the exchanged identification information of the another apparatus being used to identify the another apparatus.

4. The integrated circuit according to claim 1,
wherein the circuitry is further configured to
execute the authentication of the another apparatus using a protocol selected from available protocols exchanged with the another apparatus prior to execution of the authentication of the another apparatus.

5. The integrated circuit according to claim 1,
wherein the circuitry is further configured to
determine that the authentication information has been previously generated when the result of the determination indicates that the identification information of the another apparatus does not match the identification information of the integrated circuit,
generate, after mutually authenticating the another apparatus using the authentication information, an encryption key used for encrypted non-contact communication with the another apparatus, and
encrypt information transmitted through the non-contact communication with the another apparatus using the generated encryption key.

6. The integrated circuit according to claim 5,
wherein the circuitry is further configured to
decide a range of information to be encrypted based on a parameter exchanged with the another apparatus prior to the encryption of information transmitted through the non-contact communication with the another apparatus.

7. The integrated circuit according to claim 5, wherein the circuitry is further configured to
generate a session key after execution of the mutual authentication.

8. The integrated circuit according to claim 1,
wherein the circuitry is further configured to
determine, when encrypted communication with the another apparatus is not specified in advance to be performed prior to start of the non-contact communication with the another apparatus, generation of the authentication information used to mutually authenticate the another apparatus in performing the non-contact communication with the another apparatus depending on whether the exchanged identification information of the another apparatus is present in a history of non-contact communication after the encrypted communication with the another apparatus is specified to be performed.

9. The integrated circuit according to claim 1,
wherein the non-contact communication is communication that can be executed concurrently with establishing a plurality of connections.

10. The integrated circuit according to claim 1, wherein the circuitry is further configured to
exchange a device identification with the another apparatus.

11. The integrated circuit according to claim 10, wherein the authentication information is generated based on each of the device identifications.

12. The integrated circuit according to claim 1, wherein the non-contact communication is performed by utilizing a Near Field Communication Security layer (NFC-SEC layer).

13. The integrated circuit according to claim 1, wherein the circuitry is further configured to
determine, based on the result of the determination, whether the authentication information has been previously generated.

14. The integrated circuit according to claim 1, wherein the circuitry is further configured to
perform non-encrypted communication with the another apparatus when the result of the determination indicates that the identification information of the another apparatus is absent in a history of non-contact communication and the authentication information has not been previously generated.

15. The integrated circuit according to claim 1, wherein the authentication information comprises information of the integrated circuit and information of the another apparatus.

16. The integrated circuit according to claim 1, wherein the circuitry is further configured to
determine whether the another apparatus contains a same authentication information.

17. The integrated circuit according to claim 1,
wherein the circuitry is further configured to
generate the authentication information when the result of the determination indicates a match between the identification information of the another apparatus and the identification information of the integrated circuit.

18. The integrated circuit according to claim 1,
wherein the circuitry is further configured to
set the authentication information to a secret key when the result of the determination indicates that the identification information of the another apparatus matches the identification information of the integrated circuit.

19. The integrated circuit according to claim 1,
wherein, when the result of the determination indicates that the identification information of the another apparatus matches the identification information of the integrated circuit, the circuitry is further configured to:
determine that RF communication has been previously performed and authentication information has been previously generated; and
set the previously generated authentication information to a secret key.

20. The integrated circuit according to claim 1,
wherein, when the result of the determination indicates that the identification information of the another apparatus matches the identification information of the integrated circuit in only one direction, the circuitry is further configured to:

determine that RF communication has been previously performed and authentication information has been previously generated; and set the previously generated authentication information to a secret key.

21. The integrated circuit according to claim 1, wherein the generation of authentication information used to mutually authenticate the another apparatus is based on the exchange of the individual result of the comparison with the another individual result.

22. A communication method implemented via an integrated circuit, the method comprising:

initiating a process of authentication for communication with another apparatus through non-contact communication when the another apparatus is placed in proximity to the integrated circuit;

exchanging identification information of the integrated circuit with identification information of the another apparatus;

comparing the exchanged identification information of the another apparatus with the identification information of the integrated circuit to obtain an individual result of the comparison;

exchanging the individual result of the comparison with another individual result, from the another apparatus, of a another comparison of the exchanged identification information of the integrated circuit with the identification information of the another apparatus;

determining, when the individual results are exchanged, whether or not the identification information of the another apparatus matches the identification information of the integrated circuit, based on the individual result and the another individual result;

generating authentication information used to mutually authenticate the another apparatus based on a result of the determination that the identification information of the another apparatus does not match the identification information of the integrated circuit, the generation of the authentication information used to mutually authenticate the another apparatus being independent of an external input; and performing an encrypted Radio Frequency (RF) communication with the another apparatus after the generating of the authentication information.

23. A non-transitory, computer-readable medium storing a program that, when executed by a processor of a computer having circuitry, causes the processor to execute a method implemented via an integrated circuit, the method comprising:

initiating a process of authentication for communication with another apparatus through non-contact communication when the another apparatus is placed in proximity to the integrated circuit;

exchanging identification information of the integrated circuit with identification information of the another apparatus;

comparing the exchanged identification information of the another apparatus with the identification information of the integrated circuit to obtain an individual result of the comparison;

exchanging the individual result of the comparison with another individual result, from the another apparatus, of a another comparison of the exchanged identification information of the integrated circuit with the identification information of the another apparatus;

determining, when the individual results are exchanged, whether or not the identification information of the another apparatus matches the identification information of the integrated circuit, based on the individual result and the another individual result;

generating authentication information used to mutually authenticate the another apparatus based on a result of the determination that the identification information of the another apparatus does not match the identification information of the integrated circuit, the generation of the authentication information used to mutually authenticate the another apparatus being independent of an external input; and performing an encrypted Radio Frequency (RF) communication with the another apparatus after the generating of the authentication information.

24. A communication apparatus comprising:

an integrated circuit including a communication processing section configured to initiate authentication for communication with another apparatus through non-contact communication when the another apparatus is placed in proximity to the communication apparatus, and exchange identification information of the integrated circuit with identification information of the another apparatus, and an encryption information generation section configured to compare the exchanged identification information of the another apparatus with the identification information of the integrated circuit to obtain an individual result of the comparison, exchange the individual result of the comparison with another individual result, from the another apparatus, of another comparison of the exchanged identification information of the integrated circuit with the identification information of the another apparatus, determine, when the individual results are exchanged, whether or not the identification information of the another apparatus matches the identification information of the integrated circuit, based on the individual result and the another individual result, generate authentication information used to mutually authenticate the another apparatus based on a result of the determination that the identification information of the another apparatus does not match the identification information of the integrated circuit, the generation of the authentication information used to mutually authenticate the another apparatus being independent of an external input, and perform an encrypted Radio Frequency (RF) communication with the another apparatus after the generation of the authentication information; and a power supply configured to supply the integrated circuit with power.

* * * * *